US008165828B2

(12) United States Patent
Tombs

(10) Patent No.: US 8,165,828 B2
(45) Date of Patent: Apr. 24, 2012

(54) COMPENSATING FOR FREQUENCY CHANGE IN FLOWMETERS

(75) Inventor: Michael S. Tombs, Oxford (GB)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 13/088,092

(22) Filed: Apr. 15, 2011

(65) Prior Publication Data

US 2011/0192234 A1    Aug. 11, 2011

Related U.S. Application Data

(63) Continuation of application No. 12/344,897, filed on Dec. 29, 2008, now Pat. No. 7,930,114, which is a continuation of application No. 11/674,610, filed on Feb. 13, 2007, now Pat. No. 7,480,576.

(60) Provisional application No. 60/772,580, filed on Feb. 13, 2006, provisional application No. 60/827,845, filed on Oct. 2, 2006.

(51) Int. Cl.
*G06F 19/00* (2011.01)
(52) U.S. Cl. .......................... 702/45; 324/306
(58) Field of Classification Search .................... 702/45, 702/189, 12, 46, 47, 48, 79; 324/306
See application file for complete search history.

(56) References Cited

U.S. PATENT DOCUMENTS

| 4,768,384 A | 9/1988 | Flecken et al. |
| 5,295,084 A | 3/1994 | Arunachalam et al. |
| 5,524,475 A | 6/1996 | Kolpak et al. |
| 5,687,100 A | 11/1997 | Buttler et al. |
| 7,571,062 B2 | 8/2009 | Henry et al. |
| 7,599,807 B2 | 10/2009 | Tombs |
| 7,660,681 B2 | 2/2010 | Tombs |
| 2004/0187599 A1 | 9/2004 | Drahm et al. |
| 2007/0027641 A1* | 2/2007 | Henry .............................. 702/56 |

FOREIGN PATENT DOCUMENTS

WO    WO2004011894 A1    2/2004

OTHER PUBLICATIONS

U.S. Appl. No. 11/674,602, filed Feb. 13, 2007.
U.S. Appl. No. 11/674,589, filed Feb. 13, 2007.

(Continued)

*Primary Examiner* — Edward Raymond
(74) *Attorney, Agent, or Firm* — Edward S. Jarmolowicz, Esq.

(57) ABSTRACT

Motion is induced in a conduit that contains a fluid. The motion is induced such that the conduit oscillates in a first mode of vibration and a second mode of vibration. The first mode of vibration has a corresponding first frequency of vibration and the second mode of vibration has a corresponding second frequency of vibration. At least one of the first frequency of vibration or the second frequency of vibration is determined. A phase difference between the motion of the conduit at a first point of the conduit and the motion of the conduit at a second point of the conduit is determined. A quantity based on the phase difference and the determined frequency is determined. The quantity includes a ratio between the first frequency during a zero-flow condition and the second frequency during the zero-flow condition. A property of the fluid is determined based on the quantity.

20 Claims, 10 Drawing Sheets

OTHER PUBLICATIONS

International Search Report and Written Opinion for International Application No. PCT/US07/62081, mailed Jun. 24, 2008, 18 pages.
Office Action for U.S. Appl. No. 11/674,589, mailed Jun. 1, 2009, 13 pages.
Notice of Allowance for U.S. Appl. No. 11/674,602, mailed Jun. 2, 2009, 12 pages.
Notice of Allowance for U.S. Appl. No. 11/674,589, mailed Oct. 2, 2009, 6 pages.
Notice of Allowance for U.S. Appl. No. 12/344,897, mailed Dec. 15, 2010, 4 pages.
Office Action for U.S. Appl. No. 12/344,897, mailed Aug. 20, 2010, 10 pages.

* cited by examiner

Flowtube

COMPENSATING FOR FREQUENCY CHANGE IN FLOWMETERS

CROSS-REFERENCE TO RELATED APPLICATIONS

This application is a continuation (and claims the benefit of priority under 35 U.S.C. §120) of U.S. patent application Ser. No. 12/344,897, filed Dec. 29, 2008, now allowed, which is a continuation of U.S. patent application Ser. No. 11/674,610, filed Feb. 13, 2007 and titled COMPENSATING FOR FREQUENCY CHANGE IN FLOWMETERS, now U.S. Pat. No. 7,480,576, which claims the benefit of U.S. Provisional Application No. 60/772,580, filed on Feb. 13, 2006 and titled COMPENSATING FOR CHANGE IN FREQUENCY OF CORIOLIS FLOWMETERS WITH MASS FLOW, and the benefit of U.S. Provisional Application No. 60/827,845, filed on Oct. 2, 2006 and titled COMPENSATING FOR CHANGE IN FREQUENCY OF CORIOLIS FLOWMETERS WITH MASS FLOW, all of which are hereby incorporated by reference in their entirety.

TECHNICAL FIELD

This description relates to flowmeters.

BACKGROUND

Flowmeters provide information about materials being transferred through a conduit. For example, mass flowmeters provide a measurement of the mass of material being transferred through a conduit. Similarly, density flowmeters, or densitometers, provide a measurement of the density of material flowing through a conduit. Mass flowmeters also may provide a measurement of the density of the material.

For example, Coriolis-type mass flowmeters are based on the Coriolis effect, in which material flowing through a rotating conduit is affected by a Coriolis force and therefore experiences an acceleration. Many Coriolis-type mass flowmeters induce a Coriolis force by sinusoidally oscillating a conduit about a pivot axis orthogonal to the length of the conduit. In such mass flowmeters, the Coriolis reaction force experienced by the traveling fluid mass is transferred to the conduit itself and is manifested as a deflection or offset of the conduit in the direction of the Coriolis force vector in the plane of rotation.

SUMMARY

In one general aspect, motion is induced in a conduit such that the conduit oscillates in a first mode of vibration and a second mode of vibration. The first mode of vibration has a corresponding first frequency of vibration and the second mode of vibration has a corresponding second frequency of vibration. The conduit contains a fluid. The first frequency of vibration is determined, and the second frequency is determined. A property of the fluid is determined based on the first frequency of vibration and the second frequency of vibration.

Implementations may include one or more of the following features. For example, the property of the fluid may the density of the fluid. The density may be calculated using:

$$\rho_0 = \frac{1}{2}\left(D_4 + E_4 + \sqrt{\frac{4D_2 E_2}{\omega_1^2 \omega_2^2} + (D_4 - E_4)^2}\right),$$

where $\omega_1$ is the first frequency, $\omega_2$ is the second frequency, and $D_2$, $D_4$, $E_2$, and $E_4$ are calibration constants related to physical properties of the conduit. A first temperature and a second temperature may be determined. The calibration constants may be determined based on the first and second temperatures such that the calculation of the density is compensated for the affect of a differential between the first temperature and the second temperature.

The property of the fluid may be the mass flow rate of the fluid. Calculating the mass flow rate may include measuring the oscillation of the conduit at a first location along the conduit and at a second location along the conduit. A phase difference based on the oscillation at the first location and the oscillation at the second location may be determined. The mass flow rate may be calculated using:

$$\dot{m}_{corrected} = Mfact \cdot K \left(\frac{\omega_{20}^2}{w_{10}^2} - 1\right)_{nom} \cdot \frac{1}{\omega_2} \tan\left(\frac{\varphi}{2}\right) \cdot \left(1 + k_m \tan^2\left(\frac{\varphi}{2}\right)\right),$$

where $\omega_1$ is the first frequency, $\omega_2$ is the second frequency, $\omega_{10}$ is the first frequency during a zero-flow condition, $\omega_{20}$ is the second frequency during the zero-flow condition, k and $k_m$ are calibration constants related to physical properties of the conduit, and $\varphi$ is the phase difference. Mfact may be determined using:

$$Mfact = \frac{\left(\frac{\omega_2^2}{\omega_1^2}\left(1 - 2k\ \tan^2\left(\frac{\varphi}{2}\right)\right) - 1\right)}{\left(\frac{\omega_{20}^2}{\omega_{10}^2} - 1\right)_{nom}}.$$

Determining the first frequency and the second frequency may include receiving at least one signal from a sensor configured to monitor the oscillation of the conduit. Determination of the first frequency and the second frequency may includes determining the first frequency and the second frequency based on the at least one sensor signal.

Determining the first or second frequency may include determining physical properties associated with the conduit, and determining an expression associated with one of the first frequency or the second frequency based on the physical properties. The expression may be used to determine one of the first frequency or the second frequency.

The first frequency may be determined based on the second frequency by calculating:

$$\omega_1^2 = \omega_2^2 \frac{(E_2 + (E_2 - D_2)t_2)^2}{(E_2 + (D_4 - E_4)t_2\omega_2^2)(D_2 + (D_4 - E_4)(1 + t_2)\omega_2^2)},$$

where $\omega_1$ is the first frequency, $\omega_2$ is the second frequency, $$t_2 = k\ \tan^2\left(\frac{\varphi}{2}\right)$$

where $\phi$ is the phase difference k, $D_2$, $D_4$, $E_2$, and $E_4$ are calibration constants related to physical properties of the conduit.

The first mode may be a Coriolis mode, and the second mode may be a driven mode.

In another general aspect, motion is induced motion in a conduit such that the conduit oscillates in a first mode of vibration and a second mode of vibration. The first mode of vibration has a corresponding first frequency of vibration and the second mode of vibration has a corresponding second frequency of vibration. The first and the second frequencies vary with temperature. The conduit contains a fluid. A first temperature that influences the first mode of vibration is determined. A second temperature that influences the second mode of vibration is determined. A property of the fluid is determined based on the first temperature and the second temperature. The property depends on at least one of the first frequency or the second frequency, and the property is determined based on the first and second temperatures such that the property is compensated for at least one of the variation of the first frequency with temperature or the variation of the second frequency with temperature.

Implementations may include one or more of the following features. For example, the property may depend on both the first and second frequencies, and the property may be determined such that it is compensated for both the variation of the first frequency with temperature and the variation of the second frequency with temperature.

The property of the fluid may be the density of the fluid. Density calibration constants may be determined based on physical properties of the conduit. A reference temperature may be determined. The density calibration constants may be compensated based on the first temperature, the second temperature, and the reference temperature. The density may be determined based on the compensated density calibration constants. In another example, the density may be determined based on the calibration constants and the first frequency or the second frequency. In yet another example, the density may be determined based on the calibration constants, the first frequency, and the second frequency.

The property of the fluid may be the mass flow rate of the fluid. The mass flow rate of the fluid may depend on the first frequency during a zero-flow condition and the second frequency at the zero-flow condition.

The first temperature may be a temperature of the fluid contained in the conduit, and the second temperature may be a temperature of the conduit. In another example, the first temperature may be a temperature of the fluid contained in the conduit, and the second temperature may be an ambient temperature in the vicinity of the conduit. In yet another example, the first temperature may be a temperature of the fluid contained in the conduit, and the second temperature may be a temperature of a housing of the conduit. In yet another example, the first temperature may be a temperature of one location on the conduit, and the second temperature may be a temperature of another location on the conduit.

The first mode is a Coriolis mode, and the second mode is a driven mode.

In another general aspect, motion is induced in a conduit such that the conduit oscillates in a first mode of vibration and a second mode of vibration. The first mode of vibration has a corresponding first frequency of vibration and the second mode of vibration has a corresponding second frequency of vibration. The conduit contains a fluid. At least one of the first frequency of vibration or the second frequency of vibration is determined. A phase difference between the motion of the conduit at a first point of the conduit and the motion of the conduit at a second point of the conduit is determined. A quantity based on the phase difference and the determined frequency is determined. The quantity includes a ratio between the first frequency during a zero-flow condition and the second frequency during the zero-flow condition. A property of the fluid is determined based on the quantity.

Implementations may include one or more of the following features. For example, the quantity may be determined by:

$$\frac{\omega_{20}^2}{\omega_{10}^2} - 1 = \frac{(D_4 - E_4)\omega_2^2 + D_2 - E_2}{(D_4 - E_4)\omega_2^2 k\tan^2(\frac{\varphi}{2}) + E_2},$$

where $\omega_2$ is the second frequency, $\omega_{10}$ is the first frequency during the zero-flow condition, $\omega_{20}$ is the second frequency during the zero-flow condition, k, $D_2$, $D_4$, $E_2$, and $E_4$ are calibration constants related to physical properties of the conduit, and $\phi$ is the phase difference.

The property may include a density of the fluid contained in the conduit. Density calibration constants may be determined based on physical properties of the conduit. A reference temperature may be determined. A first temperature that influences the first mode of vibration and a second temperature that influences the second mode of vibration may be determined. The density calibration constants may be compensated based on the first temperature, the second temperature, and the reference temperature. Determining the property may include determining the density based the compensated density calibration constants and the quantity. The density may be determined based on:

$$\hat{\rho}_e = \frac{D_2}{\omega_2^2\left(1 - \left(\frac{\omega_{20}^2}{\omega_{10}^2} - 1\right)k\tan^2(\frac{\varphi}{2})\right)} + D_4,$$

where $\omega_2$ is the second frequency, $\omega_{10}$ is the first frequency during a zero-flow condition, $\omega_{20}$ is the second frequency during the zero-flow condition, k, $D_2$ and $D_4$ are calibration constants related to physical properties of the conduit, and $\phi$ is the phase difference.

The property may include a mass flow rate of the fluid contained in the conduit. The mass flow rate may be determined based on:

$$\dot{m}_{corrected} = Mfact \cdot K\left(\frac{\omega_{20}^2}{\omega_{10}^2} - 1\right)_{nom} \cdot \frac{1}{\omega_2}\tan(\frac{\varphi}{2}) \cdot \left(1 + k_m\tan^2(\frac{\varphi}{2})\right),$$

where K is a factor related to the stiffness of the conduit, $\omega_2$ is the second frequency, $\omega_{10}$ is the first frequency during a zero-flow condition, $\omega_{20}$ is the second frequency during the zero-flow condition, $k_m$ is a constant specific to the conduit, $\phi$ is the phase difference, and Mfact is $$Mfact = \frac{\left(\frac{\omega_2^2}{\omega_1^2}(1 - 2k\tan^2(\frac{\varphi}{2})) - 1\right)}{\left(\frac{\omega_{20}^2}{\omega_{10}^2} - 1\right)_{nom}}.$$

The first mode may be a Coriolis mode, and the second mode may be a driven mode.

Implementations of any of the techniques described above may include a method or process, a system, a flowmeter, or instructions stored on a storage device of flowmeter transmitter. The details of particular implementations are set forth in the accompanying drawings and description below. Other features will be apparent from the following description, including the drawings, and the claims.

DETAILED DESCRIPTION

Types of flowmeters include digital flowmeters. For example, U.S. Pat. No. 6,311,136, which is hereby incorporated by reference, discloses the use of a digital flowmeter and related technology including signal processing and measurement techniques. Such digital flowmeters may be very precise in their measurements, with little or negligible noise, and may be capable of enabling a wide range of positive and negative gains at the driver circuitry for driving the conduit. Such digital flowmeters are thus advantageous in a variety of settings. For example, commonly-assigned U.S. Pat. No. 6,505,519, which is incorporated by reference, discloses the use of a wide gain range, and/or the use of negative gain, to prevent stalling and to more accurately exercise control of the flowtube, even during difficult conditions such as two-phase flow (e.g., a flow containing a mixture of liquid and gas).

Although digital flowmeters are specifically discussed below with respect to, for example, FIGS. 1A, 1B and 2, it should be understood that analog flowmeters also exist. Although such analog flowmeters may be prone to typical shortcomings of analog circuitry, e.g., low precision and high noise measurements relative to digital flowmeters, they also may be compatible with the various techniques and implementations discussed herein. Thus, in the following discussion, the term "flowmeter" or "meter" is used to refer to any type of device and/or system in which a Coriolis flowmeter system uses various control systems and related elements to measure a mass flow, density, and/or other parameters of a material(s) moving through a flowtube or other conduit.

Figure 1A:
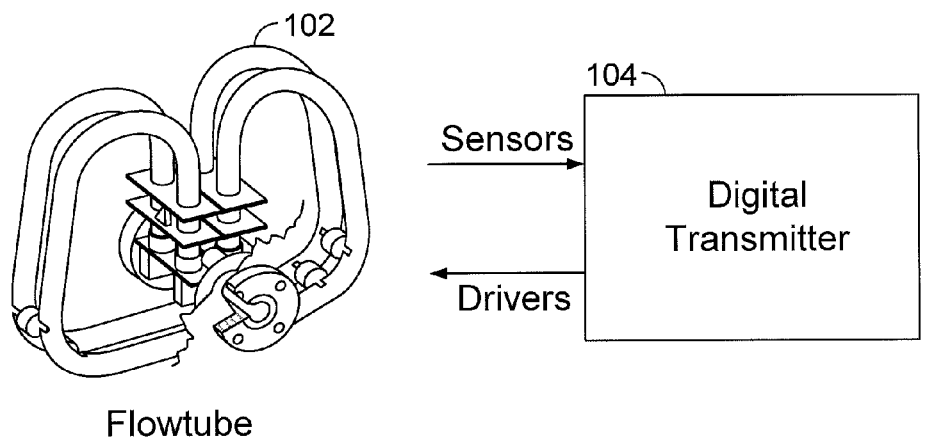
FIG. 1A is an illustration of a Coriolis flowmeter using a bent flowtube.

FIG. 1A is an illustration of a digital flowmeter using a bent flowtube 102. Specifically, the bent flowtube 102 may be used to measure one or more physical characteristics of for example, a (travelling or non-travelling) fluid, as referred to above. In FIG. 1A, a digital transmitter 104 exchanges sensor and drive signals with the bent flowtube 102, so as to both sense an oscillation of the bent flowtube 102, and to drive the oscillation of the bent flowtube 102 accordingly. By quickly and accurately determining the sensor and drive signals, the digital transmitter 104, as referred to above, provides for fast and accurate operation of the bent flowtube 102. Examples of the digital transmitter 104 being used with a bent flowtube are provided in, for example, commonly-assigned U.S. Pat. No. 6,311,136.

Figure 1B:
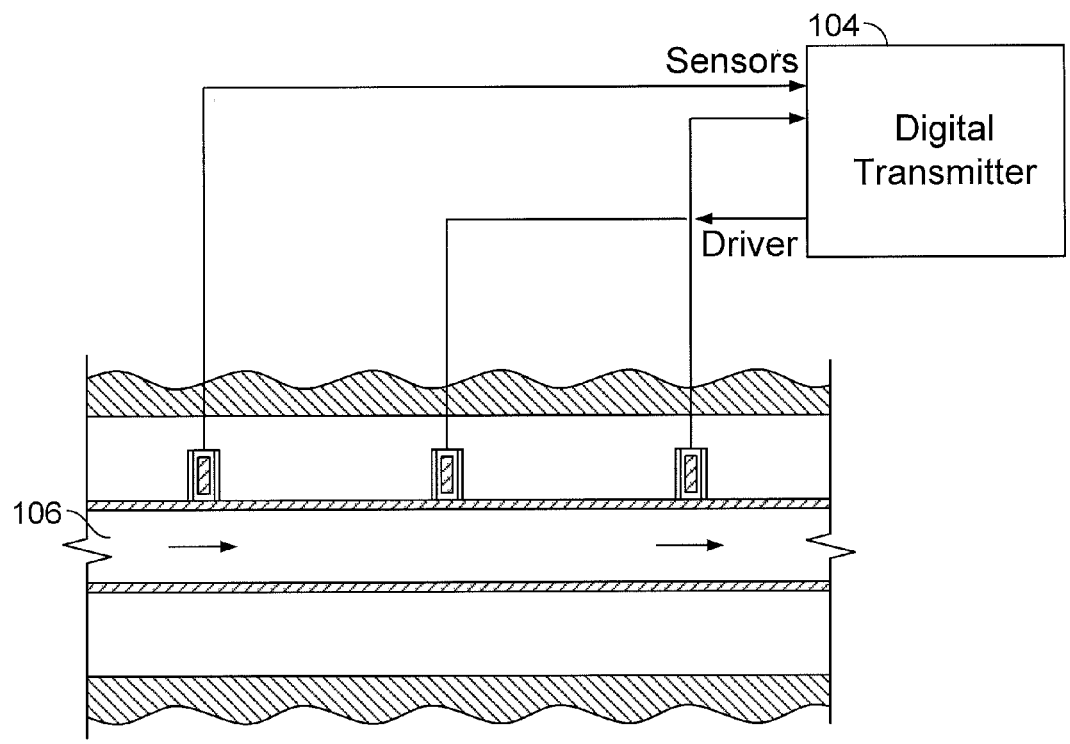
FIG. 1B is an illustration of a Coriolis flowmeter using a straight flowtube.

FIG. 1B is an illustration of a digital flowmeter using a straight flowtube 106. More specifically, in FIG. 1B, the straight flowtube 106 interacts with the digital transmitter 104. Such a straight flowtube operates similarly to the bent flowtube 102 on a conceptual level, and has various advantages/disadvantages relative to the bent flowtube 102. For example, the straight flowtube 106 may be easier to (completely) fill and empty than the bent flowtube 102, simply due to the geometry of its construction. In operation, the bent flowtube 102 may operate at a frequency of, for example, 50-110 Hz, while the straight flowtube 106 may operate at a frequency of, for example, 300-1,000 Hz. The bent flowtube 102 represents flowtubes having a variety of diameters, and may be operated in multiple orientations, such as, for example, in a vertical or horizontal orientation.

Figure 2:
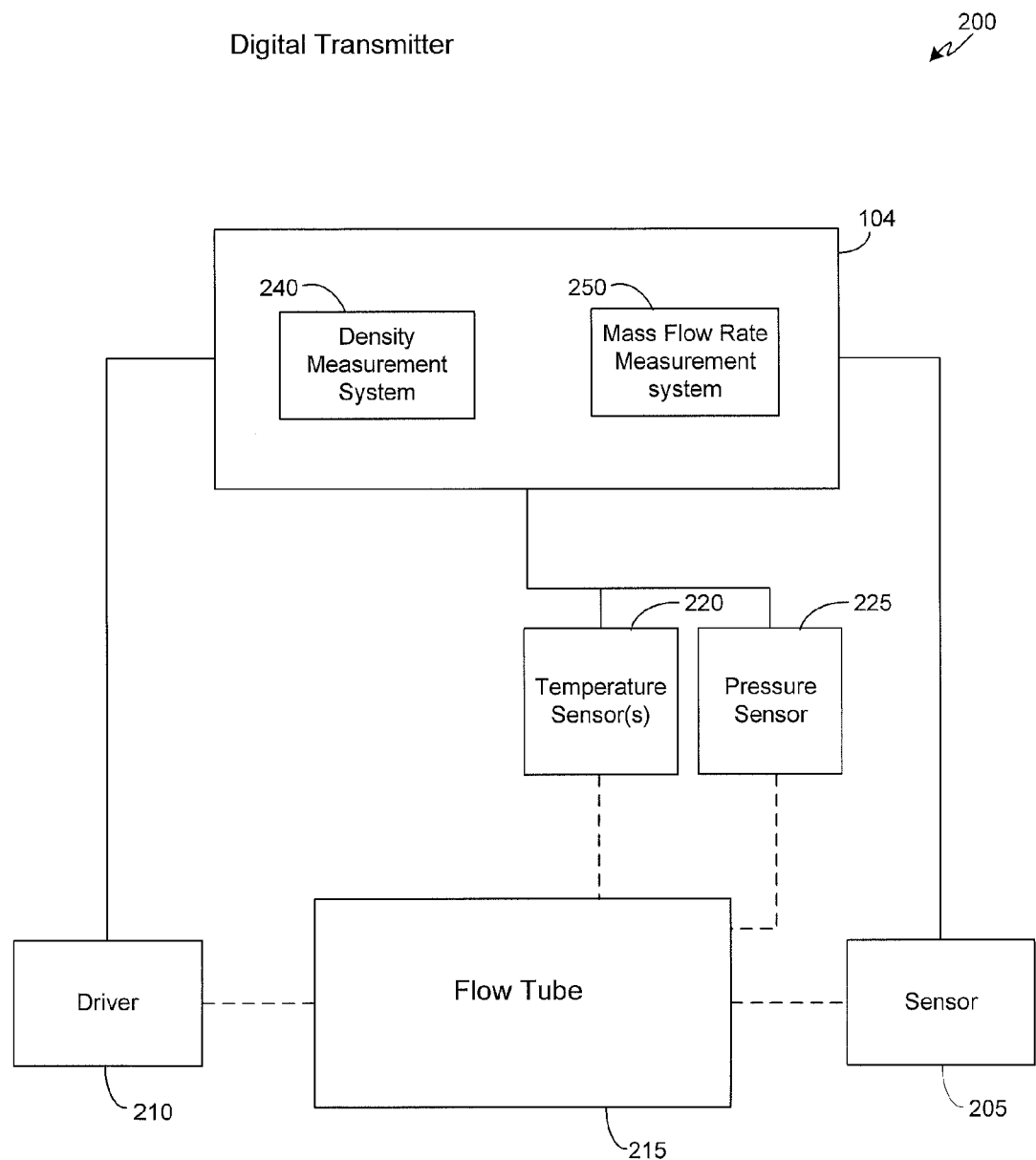
FIG. 2 is a block diagram of a digital mass flowmeter for measuring a property of a fluid.

Referring to FIG. 2, a digital mass flowmeter 200 includes the digital transmitter 104, one or more motion sensors 205, one or more drivers 210, a flowtube 215 (which also may be referred to as a conduit, and which may represent either the bent flowtube 102, the straight flowtube 106, or some other type of flowtube), and a temperature sensor 220. The digital transmitter 104 may be implemented using one or more of, for example, a processor, a Digital Signal Processor (DSP), a field-programmable gate array (FPGA), an ASIC, other programmable logic or gate arrays, or programmable logic with a processor core. It should be understood that, as described in U.S. Pat. No. 6,311,136, associated digital-to-analog converters may be included for operation of the drivers 210, while analog-to-digital converters may be used to convert sensor signals from the sensors 205 for use by the digital transmitter 104.

The digital transmitter 104 generates a measurement of, for example, density and/or mass flow rate of a material flowing through the flowtube 215, based at least on signals received from the motion sensors 205. The digital transmitter 104 also controls the drivers 210 to induce motion in the flowtube 215. This motion is sensed by the motion sensors 205.

Density measurements of the material flowing through the flowtube are related to, for example, the frequency of the motion of the flowtube 215 that is induced in the flowtube 215 (typically the resonant frequency) by a driving force supplied by the drivers 210, and/or to the temperature of the flowtube 215. Similarly, mass flow through the flowtube 215 is related to the phase and frequency of the motion of the flowtube 215, as well as to the temperature of the flowtube 215.

The temperature in the flowtube 215, which is measured using the temperature sensor 220, affects certain properties of the flowtube, such as its stiffness and dimensions. The digital transmitter 104 may compensate for these temperature effects. Also in FIG. 2, a pressure sensor 225 is in communication with the transmitter 104, and is connected to the flowtube 215 so as to be operable to sense a pressure of a material flowing through the flowtube 215.

It should be understood that both the pressure of the fluid entering the flowtube 215 and the pressure drop across relevant points on the flowtube may be indicators of certain flow conditions. Also, while external temperature sensors may be used to measure the fluid temperature, such sensors may be used in addition to an internal flowmeter sensor designed to measure a representative temperature for flowtube calibrations. Also, some flowtubes use multiple temperature sensors for the purpose of correcting measurements for an effect of differential temperature between the process fluid and the environment (e.g., a case temperature of a housing of the flowtube or a temperature of the flowtube itself). For example, two temperature sensors may be used, one for the fluid temperature and one for the flowtube temperature, and the difference between the two may be used to compensate density and/or mass flow calculations as described below.

In FIG. 2, it should be understood that the various components of the digital transmitter 104 are in communication with one another, although communication links are not explicitly illustrated, for the sake of clarity. Further, it should be understood that conventional components of the digital transmitter 104 are not illustrated in FIG. 2, but are assumed to exist within, or be accessible to, the digital transmitter 104. For example, the digital transmitter 104 will typically include drive circuitry for driving the driver 210, and measurement circuitry to measure the oscillation frequency of the flowtube 215 based on sensor signals from sensors 205 and to measure the phase between the sensor signals from sensors 205.

The digital transmitter 104 includes a (bulk) density measurement system 240 and a mass flow rate measurement system 250. The bulk density measurement system calculates the density of the travelling fluid, for example, based on equations (27), (28), (34), (35), or (36) described below, or some variation of either of these equations. The mass flow rate measurement system 250 measures the mass flow rate of the travelling fluid using, for example, equation (20) described below, or some variation of this equation. In general, the resonant frequency of vibration of the flowtube 215 for given fluid changes as the mass flow rate of the fluid changes. This can result in errors in the measured density and mass flow rate of the fluid if the flowmeter is designed under the assumption that the resonant frequency only changes with a change in density of the fluid. Using equations (27), (28), (36), or (20), or variations thereof, for the measurement of these items can compensate for such errors. Furthermore, the ratio of the Coriolis mode and driven mode of vibration at zero flow is represented in these equations. Generally, for some flowtubes, this ratio is fixed, and in such a situation the fixed value can be used directly. However, in other flowtubes, this ratio is not fixed. In such situations, equation (32), or a variation thereof, may be used by itself (or combined with equations (27), (28), (36), or (20)), to account for the change in this ratio during operation by using the observed frequency and/or observed phase. In addition, temperature differential compensation described below may be used in combination with any of these techniques.

Figure 3:
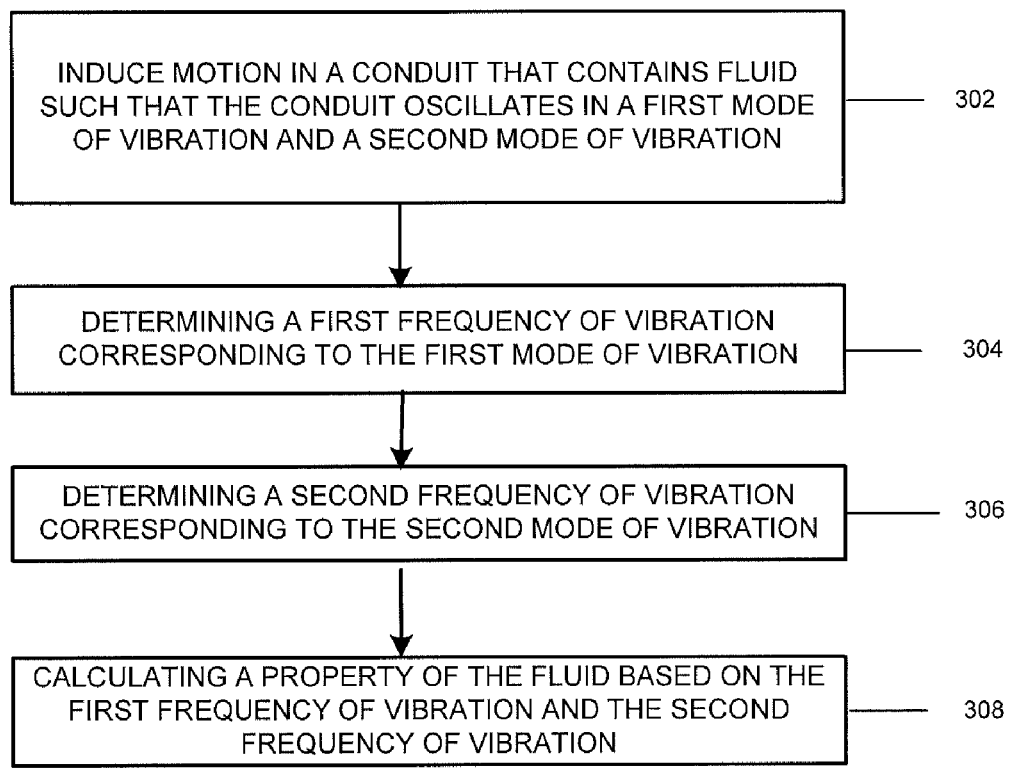
FIG. 3 is a flowchart illustrating a process for determining a property of a fluid contained in a flowtube.

Referring to FIG. 3, a process 300, which may be implemented by the digital transmitter 104, may be used to calculate a property of a fluid contained in the flowtube 215. The process 300 includes inducing motion in the flowtube 215 (302). As described above, the drivers 210 may induce motion in the flowtube 215. As a result of the induced motion, the flowtube 215 oscillates in a first mode of vibration and a second mode of vibration. The first and second modes of vibration have corresponding frequencies of vibration.

Generally, a 'bent tube' Coriolis flowtube that has two drivers can be operated in either of the first two natural modes of vibration. The flowtube is forced to oscillate in one 'driven mode', and the effect of Coriolis forces cause a movement in the second 'Coriolis mode'. Thus, the first mode of vibration may correspond to the 'Coriolis mode,' and the second mode of vibration may correspond to the 'driven mode.' Alternatively, the first mode of vibration may correspond to the 'driven mode,' and the second mode of vibration may correspond to the 'Coriolis mode.' The frequency of vibration in the Coriolis mode may be referred to as the Coriolis mode frequency, and the frequency of vibration in the drive mode may be referred to as the driven mode frequency. In many implementations, the driven mode frequency is higher than the Coriolis mode frequency. However, physical characteristics of the flowtube 215 may cause the Coriolis mode frequency to be higher than the driven mode frequency. In this implementation, the Coriolis mode may correspond to the second mode of vibration, and the driven mode may correspond to the first mode of vibration.

The process 300 also includes determining the first frequency of vibration (304) and the second frequency of vibration (306). The driven mode frequency may be observed using the sensor signals from, for example, sensors 205. The Coriolis mode frequency may be determined in a number of ways. For instance, with some flowtubes, the Coriolis mode frequency may be directly observed by switching the sense of drivers coupled to the flowtube. This may cause the flowtube to vibrate in the Coriolis mode of operation, which may allow the Coriolis mode frequency to be observed using the sensor signals from the sensors attached to the flowtube. Also, continuous estimation of the Coriolis frequency may be performed by analysis of the sensor signals.

Another manner of determining the Coriolis mode frequency may include the experimental characterization of the flowtube. This may be done to produce a generalized expression of the Coriolis mode frequency as a function of flowtube properties such as dimensions, materials, tube thicknesses, fluid and flowtube temperatures, drive frequencies and observed phase angle/massflow. This expression could use various multidimensional curve fitting techniques, such as look-up table, polynomial interpolation or artificial neural nets.

As another alternative, using the analysis shown further below, the Coriolis mode frequency may be calculated from the observed driven mode frequency using the following equation (described further below), where $\omega_1$ is the Coriolis mode frequency and $\omega_2$ is the driven mode frequency:

$$\omega_1^2 = \omega_2^2 \frac{(E_2 + (E_2 - D_2)t_2)^2}{(E_2 + (D_4 - E_4)t_2\omega_2^2)(D_2 + (D_4 - E_4)(1 + t_2)\omega_2^2)}.$$

Process 300 also includes calculating a property of the fluid contained in the flowtube 215 based on the first and second frequencies (308). For example, the calculated property may be the mass flow rate of the fluid. The following two equations (described further below) may be used to determine the mass flow rate based on the two frequencies:

$$Mfact = \frac{\left(\frac{\omega_2^2}{\omega_1^2}(1 - 2k\tan^2(\frac{\varphi}{2})) - 1\right)}{\left(\frac{\omega_{20}^2}{\omega_{10}^2} - 1\right)_{nom}}$$

$$\dot{m}_{corrected} = Mfact \cdot K\left(\frac{\omega_{20}^2}{\omega_{10}^2} - 1\right)_{nom} \cdot \frac{1}{\omega_2}\tan(\frac{\varphi}{2}) \cdot \left(1 + k_m\tan^2(\frac{\varphi}{2})\right)$$

In another example, the property of the fluid may be the density of the fluid. The density may be calculated from the determined frequencies of vibration using, for example, the following equation (described further below):

$$\rho_0 = \frac{1}{2}\left(D_4 + E_4 + \sqrt{\frac{4D_2 E_2}{\omega_1^2 \omega_2^2} + (D_4 - E_4)^2}\right).$$

where $D_2$, $D_4$, $E_2$, and $E_4$ are calibration constants, $\omega_1$ is the Coriolis mode frequency, and $\omega_2$ is the driven mode frequency. Additionally, the above density equation is independent of mass flow rate, thus it gives an accurate density calculation regardless of variations in mass flow rate.

Figure 4:
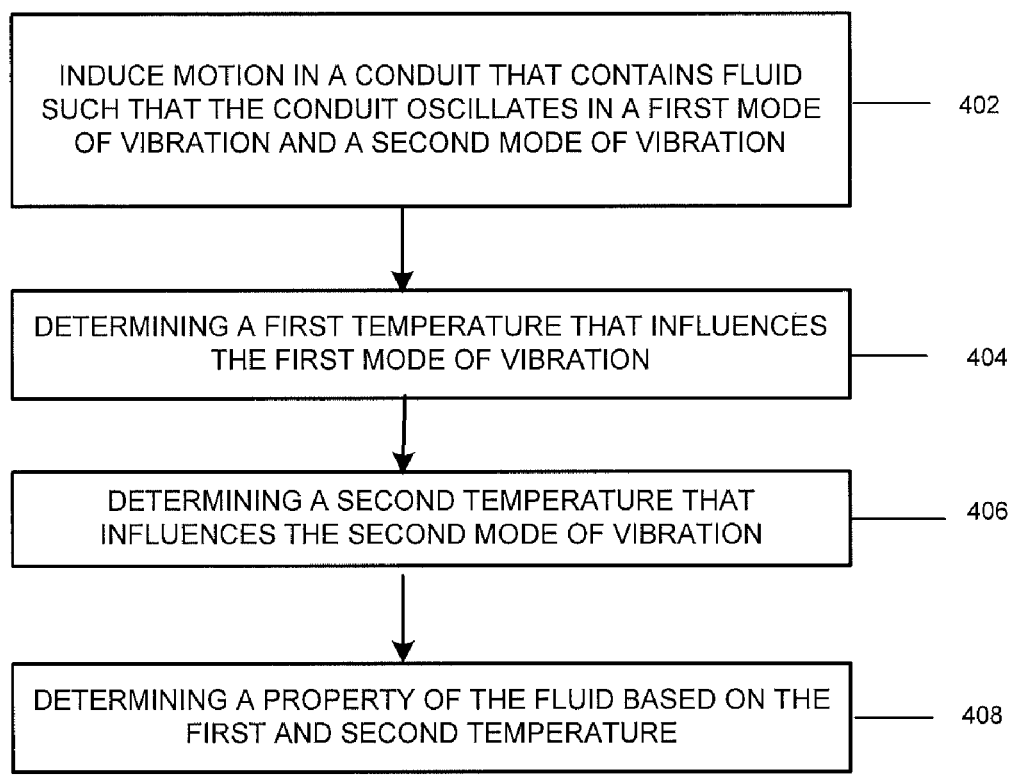
FIG. 4 is a flowchart illustrating a process for determining a property of a fluid contained in a flowtube based on two temperature measurements.

Referring to FIG. 4, a process 400, which may be implemented by the digital transmitter 104, may be used to determine a property of the fluid contained in the flowtube 215 based on two separate temperature measurements that represent a temperature differential. The presence of a temperature differential may affect the calculations of properties of the fluid, such as density and mass flow rate, that depend on at least one of the frequencies of vibration. Thus, using the two separate temperature measurements enables the property to be determined based on the two separate temperature measurements. As a result, the property may be compensated for at least one of the variation of the first frequency with temperature or the variation of the second frequency with temperature.

The temperature differential may be a difference between the temperature of one part of the flow tube as compared to another. For example, the temperature of a torsion bar in contact with the flowtube may be different than portions of the flow tube that are in contact with the fluid contained in the flow tube. One of the temperatures may influence the frequency associated with a particular mode of vibration more than the other mode of vibration. For example, the Coriolis mode frequency may be more influenced by the temperature of the fluid in the flowtube 215, and the driven mode frequency may be more influenced by the temperature of the flowtube body. The temperature that affects the frequency of a particular mode of vibration may be referred to as the "mode significant temperature." The effects of the temperature differential on the frequency may be compensated for if the mode significant temperatures are known. Although it may not be possible to measure the mode significant temperatures, as discussed below, other measurable temperatures may be used to approximate the mode significant temperatures.

Similar to process 300, process 400 includes inducing motion in the flowtube 215 (402). The motion may be induced by drivers 210, and the motion may cause the flowtube 215 to oscillate in a first mode of vibration and a second mode of vibration. As discussed above, the first mode of vibration may correspond to the Coriolis mode and the second mode of vibration may correspond to the driven mode. However, as discussed above, the first mode of vibration may correspond to the driven mode, and the second mode of vibration may correspond to the Coriolis mode. The modes of vibration each have corresponding frequencies of vibration, which may vary with temperature. Unless accounted for, this temperature variation may result in inaccuracies in the calculation of properties that depend on one or more of the frequencies of vibration, such as density and mass flow rate.

Process 400 also includes determining a first temperature (404), and a second temperature (406). In general, as described above, there may be mode significant temperatures associated with a flow tube. For instance, a temperature may influence the Coriolis mode of vibration, and a temperature, $T_2$, may influence the driven mode of vibration. As mentioned above, measurement of the mode significant temperatures may not be possible, but they may be approximated by other temperatures. For example, the mode significant temperatures may be approximated by a linear combination of the measured temperature of the fluid, $T_f$, contained in the flowtube 215 and the ambient temperature or flowtube temperature, $T_m$. The following equation shows a relationship between the mode significant temperatures, $T_1$ and $T_2$, the temperature of the fluid contained in the flowtube 215, $T_f$, and the flowtube temperature, $T_m$:

$$T_2 - T_1 = bT_f + \frac{(1-b)}{(1-c)}(T_m - cT_f) - aT_f - \frac{(1-a)}{(1-c)}(T_m - cT_f).$$

$$= \frac{(b-a)}{(1-c)}(T_f - T_m)$$

Thus, in one example, the first temperature may be the measured temperature of the fluid contained in the flowtube 215, and the second temperature may be the temperature of the flowtube 215. In another example, the second temperature may be a temperature representative of the environment of the flowtube 215, such as the case temperature of a housing of the flowtube 215 or the ambient temperature surrounding the flowtube 215. In yet another example, the first temperature may be a temperature of the flowtube 215 at one location along the flowtube 215, and the second temperature may be a temperature of the flowtube 215 at another location along the flowtube 215. The location along the flowtube 215 may be a location on a component that is in contact with, or in the vicinity of, the flowtube 215, such as a torsion bar.

The process 400 also includes determining a property of the fluid contained in the flowtube 215 based on the first and second temperatures (408). The property of the fluid is one that depends on at least one frequency of vibration, such as the density of the fluid or its mass flow rate, and the property is determined based on the two temperatures such that the property is compensated for the variation of the frequency or frequencies with temperature. For example, the property may be compensated for at least one of the variation of the first frequency with temperature or the second frequency with temperature. In one example, the density of the fluid may depend on the observed driven mode frequency. As a result of this dependency, calculation of the density may be affected by changes in the driven mode frequency that results from temperature changes. As indicated by the following equation, the density of the fluid may be calculated using the driven mode frequency and the density calibration constants $D_2$ and $D_4$, which are functions of the stiffness, dimensions, and enclosed volume of the flowtube 215:

$$\rho = \frac{D_2}{\omega_2^2} + D_4.$$

As described below with respect to FIG. 5, the density calibration constants, $D_2$ and $D_4$, may be corrected to account for the presence of a temperature differential, which enables the density to be compensated to account for the presence of a temperature differential.

In another example, mass flow rate of the fluid may depend on the driven mode frequency at zero flow and the Coriolis mode frequency at zero flow, both of which a temperature differential may affect. The mass flow may be compensated for the presence of the temperature differential, and may be determined using the following equations (described further below):

$$\dot{m}_{raw} = K_{\phi T_0}\left(\frac{r}{h^2 l}\right)_{T_0}\left(\frac{\omega_{20}^2}{\omega_{10}^2} - 1\right)\frac{1}{\omega_2}\tan\left(\frac{\varphi}{2}\right)$$

$$\dot{m}_{tcomp} = \dot{m}_{raw}(1 - \beta_1(T_1 - T_0))(1 - k_{td}(T_f - T_m)).$$

A process for compensating the mass flow rate for the presence of a temperature differential is described in more detail below with respect to FIG. 6.

Figure 5:
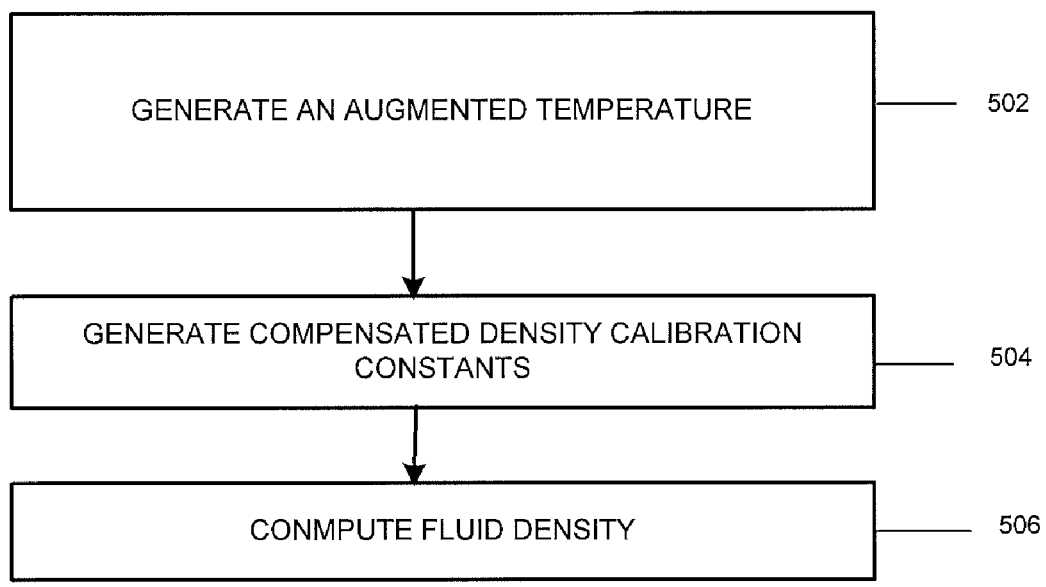
FIG. 5 is a flowchart illustrating a process for determining the density of a fluid based on two temperatures.

Referring to FIG. 5, a process 500, which may be implemented by digital transmitter 104, may be used for determining the density based on the two temperatures determined, for instance, in process 400. In particular, process 500 may be used to determine the density based on the temperature of the flowtube 215 and the temperature of the fluid contained in the flowtube 215 so as to compensate for the temperature differential between the two. The process 500 includes generating an augmented flowtube body temperature, $T_m^*$ (502). As indicated by the following equation, the augmented temperature $T_m^*$ may be calculated from the measured temperature of the flowtube 215, $T_m$, the temperature of the fluid, $T_f$, and an empirically determined constant that is specific to the flowtube 215, $k_{td2}$:

$$T_m^* = T_m + k_{td2}(T_f - T_m).$$

The process 500 also includes generating temperature-compensated density calibration constants, $D_2$ and $D_4$, based on the augmented temperature (504). The calibration constants $D_2$ and $D_4$ may be temperature compensated using the following equations, where $T_0$ is a reference temperature and C and D are flowtube specific constants:

$$D_2 = D_{20}(1 + C(T_m^* - T_0))$$

$$D_4 = D_{40}(1 + D(T_m^* - T_0))$$

Using the temperature-compensated density calibration constants, the density of the fluid may be computed (506). For instance, the density may be computed based on the density equation described with respect to FIG. 4:

$$\rho = \frac{D_2}{\omega_2^2} + D_4.$$

The temperature-compensated density calibration constants, $D_2$ and $D_4$, may enable compensation of the density calculation for the presence of the temperature differential.

Although the above density equation depends on the driven mode frequency, $\omega_2$, other implementations are possible. For example, the Coriolis mode frequency may be used to determine the fluid density instead of the driven mode frequency. In this case, the density may be calculated based on the following equation, where the calibration constants $E_2$ and $E_4$ are temperature compensated, similarly to constants $D_2$ and $D_4$:

$$\rho_0 = \frac{E_2}{\omega_1^2} + E_4$$

More specifically, in this implementation the augmented temperature, $T_f^*$ may be based on the fluid temperature rather than the temperature of the flowtube 215, as shown by the following equation:

$$T_f^* = T_f - k_{td1}(T_f - T_m).$$

The density calibration constants associated with the Coriolis mode frequency, $E_2$ and $E_4$, are then compensated using the augmented fluid temperature to account for the presence of a temperature differential. For example, the calibration constants may be compensated based on the following equations, where E and F are flowtube specific constants:

$$E_2 = E_{20}(1 + E(T_f^* - T_0))$$

$$E_4 = E_{40}(1 + F(T_f^* - T_0)).$$

In addition to compensating the density determination for the presence of a temperature differential, the density determination may additionally be compensated for the effects of mass flow rate on the frequencies using the following equation:

$$\rho_0 = \frac{1}{2}\left(D_4 + E_4 + \sqrt{\frac{4D_2 E_2}{\omega_1^2 \omega_2^2} + (D_4 - E_4)^2}\right).$$

In the above equation, the calibration constants $D_2$, $D_4$, $E_2$, and $E_4$ are the temperature-compensated calibration constants discussed above, $\omega_1$ is the Coriolis mode frequency, and $\omega_2$ is the driven mode frequency. Because the temperature-compensated calibration constants compensate the density determination for the presence of a temperature differential, the above equation enables determination of density compensated for the effect of the temperature differential on the frequencies and the effect of mass flow rate on the frequencies.

Figure 6:
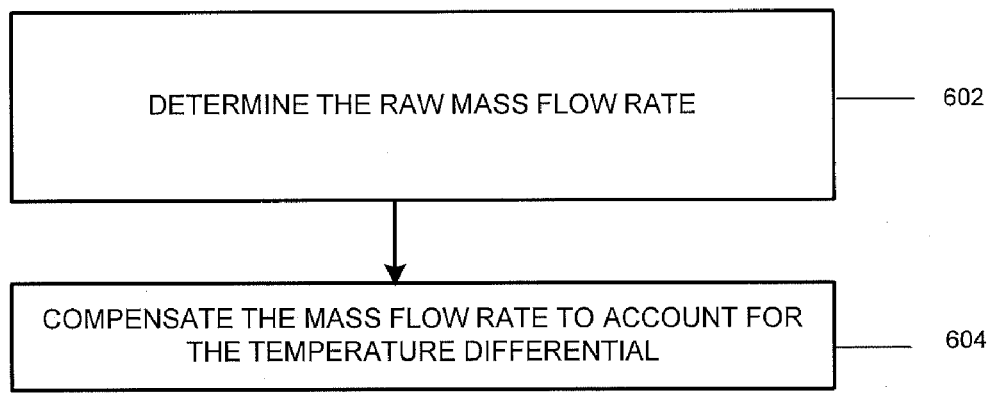
FIG. 6 is a flowchart illustrating a process for determining the mass flowrate of a fluid based on two temperatures.

Referring to FIG. 6, a process 600, which may be implemented by the digital transmitter 104, may be used for determining the mass flow rate based on the two temperatures determined, for instance, in process 400. In particular, process 600 may be used to determine the mass flow rate based on the temperature of the flowtube 215 and the temperature of the fluid contained in the flowtube 215 so as to compensate for the temperature differential between the two. The process 600 includes determining the raw mass flow rate $\dot{m}_{raw}$ (602). The raw mass flow rate may be determined using the following equation, where $\omega_{20}$ is the driven mode frequency at zero flow, $\omega_{10}$ is the Coriolis mode frequency at zero flow, and $\phi$ is the phase difference as measured between the two sensor signals from sensors 205:

$$\dot{m}_{raw} = K_{\phi T_0}\left(\frac{r}{h^2 l}\right)_{T_0}\left(\frac{\omega_{20}^2}{\omega_{10}^2} - 1\right)\frac{1}{\omega_2}\tan\left(\frac{\varphi}{2}\right).$$

The above equation determines $\dot{m}_{raw}$, which is the mass flow rate of the fluid, but this mass flow rate is not compensated to account for the presence of the temperature differential.

The process 600 also includes compensating the raw mass flow rate determined above for the presence of the temperature differential (604) using the two temperatures. The compensated mass flow rate may be determined using the following equation, where $\dot{m}_{raw}$ is the value determined in (602), $\beta_1$ is a basic temperature compensation constant, $T_1$ is a temperature that is representative of the Coriolis mode, $T_0$ is a reference temperature, $k_{td}$ is a constant that is specific to the flowtube 215, $T_f$ is the temperature of the fluid in the flowtube 215, and $T_m$ is the temperature of the flowtube 215:

$$\dot{m}_{tcomp} = \dot{m}_{raw}(1-\beta_1(T_1-T_0))(1-k_{td}(T_f-T_m)).$$

Additionally, the mass flow rate may be compensated for both the effects of mass flow rate and the temperature differential on the frequencies by using the following equation (described further below) to compute $\dot{m}_{raw}$ in (602).

$$\dot{m}_{raw} = \frac{K_\phi r}{h^2 l}\left(\frac{\omega_{20}^2}{\omega_{10}^2} - 1\right)\frac{1}{\omega_2}\tan\left(\frac{\varphi}{2}\right) \cdot \left(1 + \frac{\omega_{20}^2}{\omega_{10}^2}\frac{K_\phi}{K_\theta}\frac{r^2}{h^2}\tan^2\left(\frac{\varphi}{2}\right)\right)$$

The results may then be used to determine the temperature compensated mass flow rate, $\dot{m}_{tcomp}$. Determining $\dot{m}_{raw}$ in this manner and then using it to compute $\dot{m}_{tcomp}$ results in a mass flow rate that is compensated for the presence of a temperature differential and the effects of mass flow rate on the frequencies.

Figure 7:
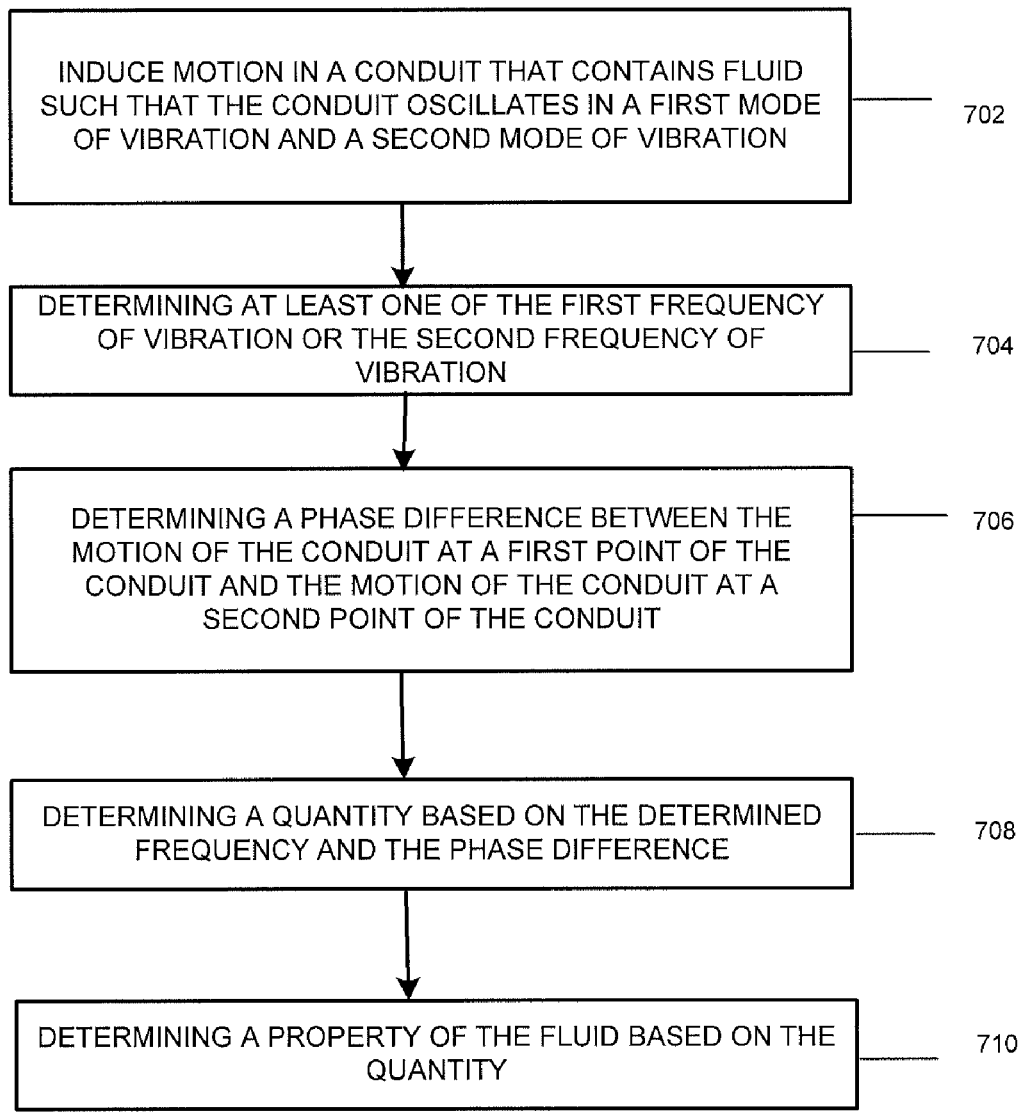
FIG. 7 is a flowchart illustrating a process for determining a property of a fluid contained in a flowtube.

Referring to FIG. 7, a process 700, which may be implemented by digital transmitter 104, may be used to determine a property of a fluid contained in a conduit such as flowtube 215. In particular, process 700 may be used to determine a quantity that includes a ratio of the driven mode frequency and the Coriolis frequency during a zero-flow condition. This quantity may be used to determine a property of the fluid. As described above, and further below, the calculation of some properties of a fluid, such as the mass flow rate and the density, may involve a quantity that includes a ratio of the driven mode frequency and the Coriolis frequency at zero-flow condition. However, for some flowtubes, or other conditions, this ratio may not be a fixed amount. Therefore, it may be desirable to calculate the quantity based on observed conditions, such as the driven mode frequency and the phase difference, and then use the calculated quantity to determine the property.

The process 700 begins by inducing motion in the flowtube 215 such that the conduit oscillates in a first mode of vibration and a second mode of vibration (702). The first mode of vibration may have a frequency of vibration that corresponds to the Coriolis mode frequency. The second mode of vibration may have a frequency that corresponds to the driven mode frequency. The process 700 also includes determining at least one of the first frequency of vibration or the second frequency of vibration (704). The process 700 further includes determining a phase difference between the motion of the flowtube 215 at a first point along the flowtube 215 and the motion of the flowtube 215 at a second point along the flowtube 215 (706). The motion at the first and second point may be measured, for example, using the motion sensors 205 described above with respect to FIG. 2.

The process 700 also includes determining a quantity based on the determined frequency (e.g., the driven mode frequency) and the phase difference (708). The quantity includes a ratio between the first frequency during a zero-flow condition and the second frequency during a zero-flow condition, such as the quantity shown on the left-hand side of the following equation:

$$\frac{\omega_{20}^2}{\omega_{10}^2} - 1 = \frac{(D_4 - E_4)\omega_2^2 + D_2 - E_2}{(D_4 - E_4)\omega_2^2 k\tan^2\left(\frac{\varphi}{2}\right) + E_2}.$$

As indicated by the above equation, the quantity may depend on the observed frequency, the phase difference, and calibration constants, which may be specific to the flowtube 215. In particular, $\omega_2$ is the second frequency, $\omega_{10}$ is the first frequency during the zero-flow condition, $\omega_{20}$ is the second frequency during the zero-flow condition, k, $D_2$, $D_4$, $E_2$, and $E_4$ are calibration constants related to physical properties of the conduit, and $\phi$ is the phase difference.

The process 700 also includes determining a property of the fluid based on the quantity (710). For example, the property of the fluid may be mass flow rate, as shown by the following equation:

$$Mfact = \frac{\left(\frac{\omega_2^2}{\omega_1^2}(1 - 2k\tan^2\left(\frac{\varphi}{2}\right)) - 1\right)}{\left(\frac{\omega_{20}^2}{\omega_{10}^2} - 1\right)_{nom}}$$

$$\dot{m}_{corrected} = Mfact \cdot K\left(\frac{\omega_{20}^2}{\omega_{10}^2} - 1\right)_{nom} \cdot \frac{1}{\omega_2}\tan\left(\frac{\varphi}{2}\right) \cdot \left(1 + k_m\tan^2\left(\frac{\varphi}{2}\right)\right)$$

In the above equation, $\omega_1$ is the first frequency, $\omega_2$ is the second frequency, $\omega_{10}$ is the first frequency during a zero-flow condition, $\omega_{20}$ is the second frequency during the zero-flow condition, k and $k_m$ are calibration constants related to physical properties of the conduit, and $\phi$ is the phase difference.

In another example, the property of the fluid may be the density of the fluid, as shown by the following equation where $\omega_1$ is the first frequency, $\omega_2$ is the second frequency, and $D_2$, $D_4$, $E_2$, and $E_4$ are calibration constants related to physical properties of the conduit:

$$\hat{\rho}_e = \frac{D_2}{\omega_2^2\left(1 - \left(\frac{\omega_{20}^2}{\omega_{10}^2} - 1\right)\frac{K_\phi}{K_\theta}\frac{r^2}{h^2}\tan^2\left(\frac{\varphi}{2}\right)\right)} + D_4.$$

The rest of this disclosure provides an analytical explanation for the observed change in vibration frequency of a Coriolis flowmeter with a change in mass flow rate and/or with a temperature differential across parts of the system. This explanation can be used to implement the techniques described above, and further below, to correct for errors resulting from these effects.

As described above, a 'bent tube' Coriolis flowtube that has two drivers can be operated in either of the first two natural modes of vibration. The flowtube is forced to oscillate in one 'driven mode', and the effect of Coriolis forces cause a movement in the second 'Coriolis mode'. Also as explained above, the Coriolis mode may be the first mode of vibration, and the driven mode may be the first mode of vibration. However, the converse may also occur. The change in resonant frequency with mass flow rate can be explained by considering the effect of the secondary Coriolis forces resulting from this Coriolis mode superimposed on those in the 'driven mode'. Furthermore the change in frequency with mass flow rate is shown to lower the natural frequency of lowest frequency mode, and to raise the upper frequency, irrespective of the shape of the two modes of vibration, or which mode is selected to be driven.

Mass Flow Rate Affect on Density and Mass Flow Rate Calculations

In the following analysis a simple straight sided rectangular frame tube is considered and it is assumed that deflections due to applied forces lead to rotations of the tubes only. The deflections and rotations are considered to be sufficiently small such that only forces perpendicular to the tubes can be considered. It is believed that similar results will be obtained by extending the analysis to curved tubes with simple bending modes of vibration.

Figure 8:
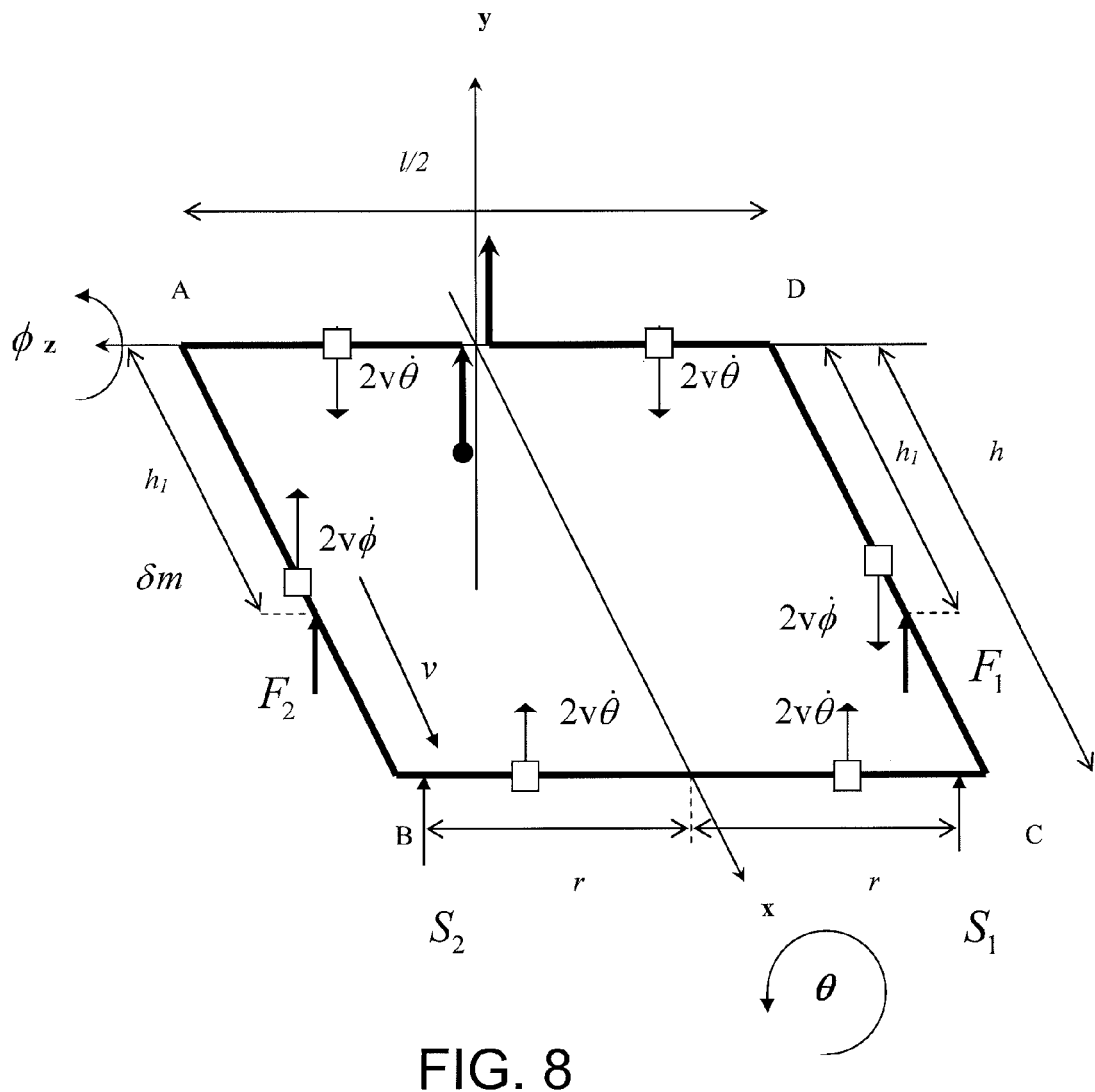
FIG. 8 is an illustration of a stiff-walled flowtube.

FIG. 8 shows a schematic of a stiff walled flowtube. Fluid travels in the direction ABCD with constant speed v. The side tubes each have length h and the middle section length l/2. For ease of analysis, the flowtube is shown as straight sided, but the equations should be representative of any flowtube with curved sides where motions and forces are resolved in the orthogonal axes. The directions and magnitudes of the Coriolis acceleration experienced by an element of mass $\delta m = \rho A \delta l$ of fluid with density $\rho$ travelling along each straight section of pipe of cross sectional area A are shown on the diagram. This acceleration is due to the change in angular momentum of the particle as its lateral velocity changes when moving to/from the centre of rotation. This fluid acceleration is provided by lateral forces from the tube wall, and therefore the fluid exerts equal and opposite forces on the tube. This theoretical flowtube has two independent modes of rotation about the x and z axes. The inlet and exit tube sections are sufficiently close to enable cancellation of forces with negligible moment. The mass flow is constant and no forces or rotation about the y axis are considered. Centrifugal/centripetal forces in the xz plane are not considered—in practice they will cause tube shape bending distortion which would affect the modes of vibration.

This model flowtube can be 'driven' in either of the two fundamental modes of vibration with drivers F1 and F2. The motion of the flowtubes is observed by sensors at S1 and S2.

Considering rotation about the x and z axes separately and integrating the forces along the length of the tubes we obtain the following equations of motion $$I_x \ddot{\theta} + C_\theta \dot{\theta} + K_\theta \theta = (F_1 - F_2)l/4 + 2 \times \rho A h \times 2 v \dot{\phi} \times l/4$$

$$I_z \ddot{\phi} + C_\phi \dot{\phi} + K_\phi \phi = (F_1 + F_2)h_1 - \rho A l/2 \times 2 v \dot{\theta} \times h \quad (1)$$

where $I_x$ and $I_z$ are moments of inertia about their respective axes. For uniform pipe and uniform density fluid these terms are proportional to the total mass of flowtube and contents and readily computed, but in practice sensor and actuators will add point masses which may be compensated by additional masses so this analysis does not expand them here.

For the small deflections considered, C and K are positive constants defining the effective damping and spring stiffness opposing the motion.

Taking Laplace transforms and substituting $$\dot{m} = \rho A v \quad (2)$$

we obtain the following form of the equations of motion $$\begin{pmatrix} I_x s^2 + C_\theta s + K_\theta & -hl\dot{m}s \\ hl\dot{m}s & I_z s^2 + C_\phi s + K_\phi \end{pmatrix} \begin{pmatrix} \theta \\ \phi \end{pmatrix} = \begin{pmatrix} (F_1 - F_2)l/4 \\ (F_1 + F_2)h_1 \end{pmatrix} \quad (3)$$

The response of the system may be expressed as two second order responses with modes defined by the solution of the characteristic equation formed from the determinant of the left-hand matrix:—

$$(I_x s^2 + C_\theta s + K_\theta)(I_z s^2 + C_\phi s + K_\phi) + h^2 l^2 \dot{m}^2 s^2 = 0 \quad (4)$$

which shows how the modes of vibration are independent when the mass flow is zero, but are coupled with non-zero mass flow.

Figure 9:
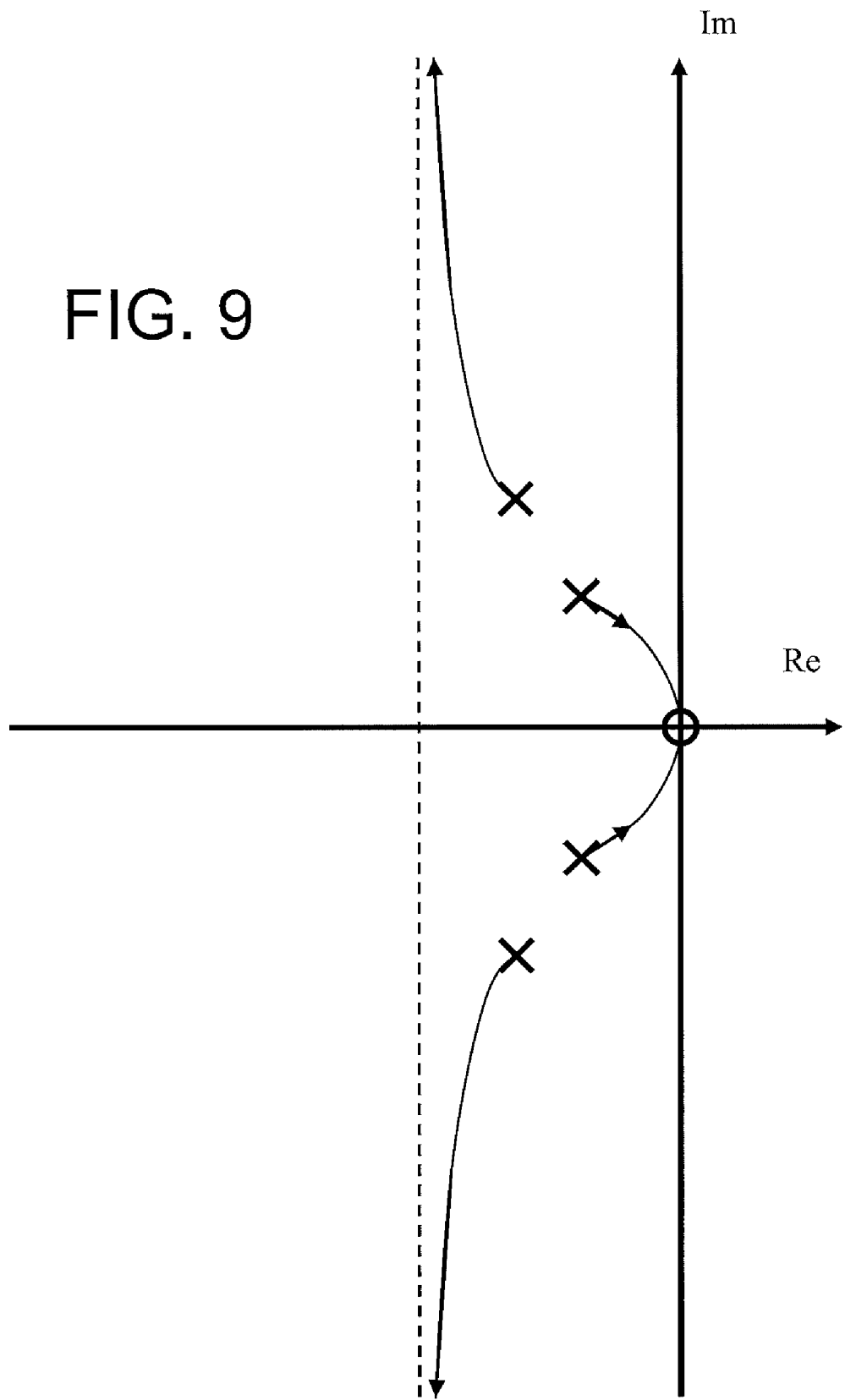
FIG. 9 is a graph of the poles of a flowtube system as a function of increasing mass flow rate.

Equation (4) can be solved numerically for any actual values of the constants, or simple approximate solutions are given later—but the behavior of the roots can be illustrated with a classical root locus diagram, which is shown in FIG. 9. Specifically, FIG. 9 shows the root locus of the position of the poles of the system with increasing mass-flow. The damped natural frequency is given by the imaginary co-ordinate; the undamped natural frequency is given by the distant from a pole to the origin.

With no damping, equation (4) reduces to that of steady oscillation with frequency found using $s = j\omega$ such that $$(K_\theta - I_x \omega^2)(K_\phi - I_z \omega^2) - h^2 l^2 \dot{m}^2 \omega^2 = 0 \quad (5)$$

Or $$(\omega^2 - \omega_{20}^2)(\omega^2 - \omega_{10}^2) - \frac{h^2 l^2 \dot{m}^2 \omega^2 \omega_{10}^2 \omega_{20}^2}{K_\theta K_\phi} = 0 \quad (6)$$

where $$\omega_{10}^2 = \frac{K_\phi}{I_z}, \quad \omega_{20}^2 = \frac{K_\theta}{I_x} \quad (7)$$

If the solutions to equation (6) are $\omega = \omega_1, \omega_2$ then it is possible to express equation (6) in factorized form:—

$$(\omega^2 - \omega_1^2)(\omega^2 - \omega_2^2) = 0 \quad (8)$$

by expanding and comparing coefficients of powers of $\omega$ it is clear that solutions to equation (5) have the property (without further approximation) that $$\omega_1^2 \omega_2^2 = \frac{K_\theta K_\phi}{I_x I_z} = \omega_{10}^2 \omega_{20}^2 \quad (9)$$

independent of massflow, which suggests that the geometric mean of the frequencies would be a mass flow independent frequency which could be very useful for density measurement. Also $$\omega_1^2 + \omega_2^2 = \frac{K_\phi}{I_z} + \frac{K_\theta}{I_x} + \frac{h^2 l^2 \dot{m}^2}{I_x I_z} = \omega_{10}^2 + \omega_{20}^2 + \frac{h^2 l^2 \dot{m}^2}{I_x I_z} \quad (10)$$

Exact solutions to equation (6) are given by $$\omega^2 = \frac{\omega_{10}^2 + \omega_{20}^2}{2} + \frac{\left( h^2 l^2 \dot{m}^2 \omega_{10}^2 \omega_{20}^2 \mp \sqrt{\left( K_\theta K_\phi (\omega_{10}^2 + \omega_{20}^2) + h^2 l^2 \dot{m}^2 \omega_{10}^2 \omega_{20}^2 \right)^2 - 4 K_\theta^2 K_\phi^2 \omega_{10}^2 \omega_{20}^2} \right)}{2 K_\theta K_\phi} \quad (11)$$

Assuming that the change in frequency due to mass flow is very small, and that the natural frequencies are distinct, equation (6) will have approximate solutions, neglecting terms in $\dot{m}^4$ and above $$\omega_1^2 \approx \frac{\omega_{10}^2}{1 + \frac{h^2 l^2 \omega_{20}^2 \dot{m}^2}{K_\phi K_\theta \left(\frac{\omega_{20}^2}{\omega_{10}^2} - 1\right)}} \quad (12)$$

$$\omega_2^2 \approx \frac{\omega_{20}^2}{1 - \frac{h^2 l^2 \omega_{20}^2 \dot{m}^2}{K_\phi K_\theta \left(\frac{\omega_{20}^2}{\omega_{10}^2} - 1\right)}}$$

which shows that if $\omega_{20} > \omega_{10}$ then $\omega_2 > \omega_{20}$ and $\omega_1 < \omega_{10}$ and conversely if $\omega_{20} < \omega_{10}$ then $\omega_2 < \omega_{20}$ and $\omega_1 > \omega_{10}$.

Now consider the flowtube driven in the second mode of vibration $\omega = \omega_2$, with $F_2 = F_1$ just sufficient to counter the effects of damping then equation (3) has the following steady state time solution, ignoring damping and free vibration in the Coriolis mode—

$$\theta = \theta_0 \sin(\omega_2 t) \quad (13)$$

$$\phi = -\frac{hl\dot{m}\omega_2}{K_\phi - I_z \omega_2^2} \theta_0 \cos(\omega_2 t) = \frac{hl\dot{m}\omega_2}{K_\phi \left(\frac{\omega_2^2}{\omega_{10}^2} - 1\right)} \theta_0 \cos(\omega_2 t)$$

assuming all deflections are small, and sensors detect the linear displacement $S_1, S_2$ at their location defined by r, h $$S_1 = h\phi + r\theta$$

$$S_2 = h\phi - r\theta \quad (14)$$

The phase difference $\phi$ between the signals will be given by $$\tan\left(\frac{\varphi}{2}\right) = \frac{h^2 l \omega_2}{K_\phi r \left(\frac{\omega_2^2}{\omega_{10}^2} - 1\right)} \dot{m} \quad (15)$$

which can be rearranged to give the more familiar Coriolis mass flowmeter form $$\dot{m} = \frac{K_\phi r}{h^2 l}\left(\frac{\omega_2^2}{\omega_{10}^2} - 1\right)\frac{1}{\omega_2}\tan\left(\frac{\varphi}{2}\right) \quad (16)$$

Now $$\left(\frac{\omega_2^2}{\omega_{10}^2} - 1\right) = \quad (17)$$

$$\frac{\omega_{20}^2}{\omega_{10}^2} \cdot \frac{1}{1 - \frac{h^2 l^2 \omega_{20}^2 \dot{m}^2}{K_\phi K_\theta \left(\frac{\omega_{20}^2}{\omega_{10}^2} - 1\right)}} - 1 \approx \frac{\omega_{20}^2}{\omega_{10}^2} - 1 + \frac{\omega_{20}^2}{\omega_{10}^2} \frac{h^2 l^2 \omega_{20}^2 \dot{m}^2}{K_\phi K_\theta \left(\frac{\omega_{20}^2}{\omega_{10}^2} - 1\right)} \approx$$

$$\left(\frac{\omega_{20}^2}{\omega_{10}^2} - 1\right)\left(1 + \frac{\omega_{20}^2}{\omega_{10}^2} \frac{h^2 l^2 \omega_{20}^2 \dot{m}^2}{K_\phi K_\theta \left(\frac{\omega_{20}^2}{\omega_{10}^2} - 1\right)^2}\right) \approx$$

-continued $$\left(\frac{\omega_{20}^2}{\omega_{10}^2} - 1\right)\left(1 + \frac{\omega_{20}^2}{\omega_{10}^2} \frac{K_\phi}{K_\theta} \frac{r^2}{h^2}\left(\frac{h^2 l \omega_{20} \dot{m}}{K_\phi r \left(\frac{\omega_{20}^2}{\omega_{10}^2} - 1\right)}\right)^2\right)$$

Given that the change in frequency is small let $\omega_{20} \approx \omega_2$ in the right hand term and substitute for the massflow from equation (16) to obtain $$\left(\frac{\omega_2^2}{\omega_{10}^2} - 1\right) \approx \left(\frac{\omega_{20}^2}{\omega_{10}^2} - 1\right)\left(1 + \frac{\omega_{20}^2}{\omega_{10}^2} \frac{K_\phi}{K_\theta} \frac{r^2}{h^2}\tan^2\left(\frac{\varphi}{2}\right)\right) \quad (18)$$

Or $$\left(\frac{\omega_2^2}{\omega_{10}^2} - 1\right) \approx \left(\frac{\omega_{20}^2}{\omega_{10}^2} - 1\right)\left(1 + \frac{I_z}{I_x} \frac{r^2}{h^2}\tan^2\left(\frac{\varphi}{2}\right)\right) \quad (19)$$

So that equation (16) for the mass flow as a function of phase angle $\phi$ and frequency $\omega_2$, all other variables assumed constant, taking into account the frequency change with mass flow can be expressed as $$\dot{m} = \frac{K_\phi r}{h^2 l}\left(\frac{\omega_{20}^2}{\omega_{10}^2} - 1\right)\frac{1}{\omega_2}\tan\left(\frac{\varphi}{2}\right) \cdot \left(1 + \frac{\omega_{20}^2}{\omega_{10}^2} \frac{K_\phi}{K_\theta} \frac{r^2}{h^2}\tan^2\left(\frac{\varphi}{2}\right)\right) \quad (20)$$

Similarly $$\omega_2^2\left(1 - \frac{h^2 l^2 \omega_{20}^2 \dot{m}^2}{K_\phi K_\theta \left(\frac{\omega_{20}^2}{\omega_{10}^2} - 1\right)}\right) = \omega_2^2\left(1 - \left(\frac{\omega_{20}^2}{\omega_{10}^2} - 1\right)\frac{K_\phi}{K_\theta}\frac{r^2}{h^2}\left(\frac{\omega_{20} h^2 l \dot{m}}{K_\phi r \left(\frac{\omega_{20}^2}{\omega_{10}^2} - 1\right)}\right)^2\right) \quad (21)$$

$$\approx \omega_2^2\left(1 - \left(\frac{\omega_{20}^2}{\omega_{10}^2} - 1\right)\frac{K_\phi}{K_\theta}\frac{r^2}{h^2}\tan^2\left(\frac{\varphi}{2}\right)\right)$$

Which by comparison with equation (12) implies that $$\omega_{20}^2 \approx \omega_2^2\left(1 - \left(\frac{\omega_{20}^2}{\omega_{10}^2} - 1\right)\frac{K_\phi}{K_\theta}\frac{r^2}{h^2}\tan^2\left(\frac{\varphi}{2}\right)\right) \quad (22)$$

Now the frequency of oscillation of the flowtube with zero flow $\omega_{20}$ will be a function of the fluid density $\rho$ and the fixed mass of the flowtube with an expression such as $$\omega_{20}^2 = \frac{K_\theta}{I_x} \quad (23)$$

$$= \frac{K_\theta}{M_t + b\rho}$$

Where $M_t$ is a constant term representing the fixed flowtube mass and dimensions, b is another constant derived from flowtube dimensions which shows how the variable mass of the fluid contained in the flowtube may be incorporated.

So the flowtube can be calibrated to give $$\rho_0 = \frac{D_2}{\omega_{20}^2} + D_4 \quad (24)$$

Where $D_2$, $D_4$ are flowtube specific calibration constants, which may be further compensated for the effects of temperature.

An estimate of the true fluid density can be obtained with $$\rho_e = \frac{D_2}{\omega_2^2} + D_4 \quad (25)$$

So that the error is given by $$\rho_e - \rho_0 = -\frac{D_2}{\omega_{20}^2}\left(\frac{\omega_{20}^2}{\omega_{10}^2} - 1\right)\frac{K_\phi}{K_\theta}\frac{r^2}{h^2}\tan^2\left(\frac{\varphi}{2}\right) \quad (26)$$
$$= -(\rho_0 - D_4)\left(\frac{\omega_{20}^2}{\omega_{10}^2} - 1\right)\frac{K_\phi}{K_\theta}\frac{r^2}{h^2}\tan^2\left(\frac{\varphi}{2}\right)$$

Note that in equation (26) $D_4$ is negative, so that when the "Coriolis Mode" is less than the "Drive Mode" $\omega_{20}$, an uncorrected density reading will under-read, for other tubes where the frequency ratio is reversed they will over-read. Equation (20) predicts that irrespective of the magnitude of the ratio of frequencies an uncorrected massflow reading will under-read at high flow/phase angle. Note also that equations (16) and (20) show that the phase signal for a given massflow (all other connections similar) changes sign depending on the location of the Coriolis frequency above or below the Drive frequency.

Substituting equation (22) into equation (24) we obtain a version of equation (25) which provides a mass flow insensitive estimate of the fluid density $\hat{\rho}_e$ directly from the observed flowtube drive frequency $\omega_2$ and the observed phase angle $\phi$.

$$\hat{\rho}_e = \frac{D_2}{\omega_2^2\left(1 - \left(\frac{\omega_{20}^2}{\omega_{10}^2} - 1\right)\frac{K_\phi}{K_\theta}\frac{r^2}{h^2}\tan^2\left(\frac{\varphi}{2}\right)\right)} + D_4 \quad (27)$$

Note that we can re-arrange equation (26) to give an improved estimate of the true fluid density $\hat{\rho}_0$ using the uncorrected density estimate $\rho_e$ from equation (25)

$$\hat{\rho}_0 = \frac{\rho_e - D_4\left(\frac{\omega_{20}^2}{\omega_{10}^2} - 1\right)\frac{K_\phi}{K_\theta}\frac{r^2}{h^2}\tan^2\left(\frac{\varphi}{2}\right)}{\left(1 - \left(\frac{\omega_{20}^2}{\omega_{10}^2} - 1\right)\frac{K_\phi}{K_\theta}\frac{r^2}{h^2}\tan^2\left(\frac{\varphi}{2}\right)\right)} \quad (28)$$

Note also that the zero flow natural frequency of the Coriolis mode $\omega_{10}$ will also be a function of the true fluid density $\rho_0$, and in a similar manner to equation (24) may be calibrated as $$\rho_0 = \frac{E_2}{\omega_{10}^2} + E_4 \quad (29)$$

Combining equations (29) and (24) the ratio of the frequencies is given by $$\frac{\omega_{20}^2}{\omega_{10}^2} = \frac{(D_4 - E_4)\omega_{20}^2 + D_2}{E_2} \quad (30)$$

Substituting an estimate for $\omega_{20}$ in the right hand side, based on the observed $\omega_2$ using equation (22) we obtain $$\frac{\omega_{20}^2}{\omega_{10}^2} = \frac{(D_4 - E_4)\omega_2^2\left(1 - \left(\frac{\omega_{20}^2}{\omega_{10}^2} - 1\right)\frac{K_\phi}{K_\theta}\frac{r^2}{h^2}\tan^2\left(\frac{\varphi}{2}\right)\right) + D_2}{E_2} \quad (31)$$

Which simplifies to $$\frac{\omega_{20}^2}{\omega_{10}^2} - 1 = \frac{(D_4 - E_4)\omega_2^2 + D_2 - E_2}{(D_4 - E_4)\omega_2^2\frac{K_\phi}{K_\theta}\frac{r^2}{h^2}\tan^2\left(\frac{\varphi}{2}\right) + E_2} \quad (32)$$

Which may be further simplified to $$\frac{\omega_{20}^2}{\omega_{10}^2} - 1 = \frac{(D_4 - E_4)\omega_2^2 + D_2 - E_2}{(D_4 - E_4)\omega_2^2 k\tan^2\left(\frac{\varphi}{2}\right) + E_2} \quad (32a)$$

In equation (32a), $\omega_2$ is the second frequency, $\omega_{10}$ is the first frequency during the zero-flow condition, $\omega_{20}$ is the second frequency during the zero-flow condition, k, $D_2$, $D_4$, $E_2$, and $E_4$ are calibration constants related to physical properties of the conduit, and $\phi$ is the phase difference.

Therefore we have an expression for this ratio as a function of observed frequency and phase, and calibration constants. This can be used in equations for mass flow and density.

The above analysis also may be used to obtain a massflow independent measure of the fluid density based on the observed driven frequency and the natural frequency of the Coriolis mode.

Repeating equation (9)

$$\omega_1^2 \omega_2^2 = \frac{K_\theta K_\phi}{I_x I_z} = \omega_{10}^2 \omega_{20}^2 \quad (33)$$

Which indicates that the product (or geometric mean) of the Coriolis and Drive frequencies is a function only on fluid density, and not mass flow.

Now by experiment at zero flow, with different fluids in the flowtube it is possible to obtain calibration coefficients which explain how each frequency varies with fluid density, repeating equations (24) and (29)

$$\rho_0 = \frac{D_2}{\omega_{20}^2} + D_4 \quad (34)$$

$$\rho_0 = \frac{E_2}{\omega_{10}^2} + E_4 \quad (35)$$

Combining (34) and (35) we may obtain an expression for the fluid density as a function of the actual frequencies for any massflow.

$$\rho_0 = \frac{1}{2}\left(D_4 + E_4 + \sqrt{\frac{4D_2E_2}{\omega_1^2\omega_2^2} + (D_4 - E_4)^2}\right) \quad (36)$$

Now $\omega_2$ is the observed driven frequency of the flowtube, and $\omega_1$ is the natural frequency of the Coriolis mode at the actual mass flowrate.

As described above, techniques for measuring the Coriolis frequency include, but are not limited to the following:
1. With some flowtubes, direct observation by switching the sense of drivers coupled to the flowtube. This may cause the flowtube to vibrate in the Coriolis mode of operation.
2. Continuous estimation of the Coriolis frequency may be performed by analysis of the sensor signals.
3. Experimental characterization of the flowtube may be performed to produce a generalized expression of the Coriolis frequency as a function of flowtube properties such as dimensions, materials, tube thicknesses, fluid and flowtube temperatures, drive frequencies and observed phase angle/massflow. This expression could use various multidimensional curve fitting techniques, such as look-up table, polynomial interpolation or artificial neural nets.
4. Using the analysis shown previously in this document, experimental calibration of coefficients may lead to an ability to calculate the natural frequency of the Coriolis mode based on the observed driven mode frequency. For example:—

Substituting $$t_2 = \frac{K_\phi}{K_\theta}\frac{r^2}{h^2}\tan^2\left(\frac{\varphi}{2}\right) \quad (37)$$

An expression for $\omega_1$ may be obtained as follows $$\omega_1^2 = \omega_2^2 \frac{(E_2 + (E_2 - D_2)t_2)^2}{(E_2 + (D_4 - E_4)t_2\omega_2^2)(D_2 + (D_4 - E_4)(1 + t_2)\omega_2^2)} \quad (38)$$

Now for a class of flowtubes where the ratio of zero mass flow frequencies are constant irrespective of the fluid density we have $$D_4 = E_4 \quad (39)$$
$$\frac{D_2}{E_2} = \frac{\omega_{20}^2}{\omega_{10}^2} = \gamma$$

And equation (38) reduces to $$\omega_1^2 = \omega_2^2\frac{(E_2 + (E_2 - D_2)t_2)^2}{E_2D_2} \quad (40)$$
$$= \frac{\omega_2^2}{\gamma}(1 + (1-\gamma)t_2)^2$$

Temperature Compensation with Multiple Temperature Measurements

In addition to the effect of mass flow on the frequency, the temperature differential between the fluid and the flowtube may affect the density and/or mass flow calculations. Implementations may compensate for this affect of the temperature differential.

A simplified version of equation (20), ignoring the effect of mass flow on frequency, relating phase angle to mass flow is—

$$\dot{m} = \frac{K_\phi r}{h^2 l}\left(\frac{\omega_{20}^2}{\omega_{10}^2} - 1\right)\frac{1}{\omega_2}\tan\left(\frac{\varphi}{2}\right) \quad (41)$$

Where the no-flow Coriolis and Drive mode frequencies are defined by $$\omega_{10}^2 = \frac{K_\phi}{I_z}, \omega_{20}^2 = \frac{K_\theta}{I_x} \quad (42)$$

It is to be expected that temperature change will reduce the Young's modulus of the material used in the flowtube, and increase the dimensions through thermal expansion.

A first order model approximation to these effects is $$K_{\phi T_1} = K_{\phi T_0}(1-\beta_1(T_1-T_0))$$

$$\omega_{10T_1}^2 = \omega_{10T_0}^2(1-\alpha_1(T_1-T_0))$$

$$\omega_{20T_2}^2 = \omega_{20T_0}^2(1-\alpha_2(T_2-T_0)) \quad (43)$$

Where $T_0$ is a reference temperature, $T_1, T_2$ are representative temperatures for the Coriolis and Drive vibration modes.

For robust massflow calibration, it is useful to understand the variation with differential temperature of the 'ideally constant' multiplicative factor $$\left(\frac{\omega_{20T_2}^2}{\omega_{10T_1}^2} - 1\right) = \left(\frac{\omega_{20T_0}^2(1-\alpha_2(T_2-T_0))}{\omega_{10T_0}^2(1-\alpha_1(T_1-T_0))} - 1\right) \approx \quad (44)$$

$$\left(\frac{\omega_{20T_0}^2}{\omega_{10T_0}^2}(1 - \alpha_2(T_2-T)_0 + \alpha_1(T_1-T_0)) - 1\right) \approx$$

$$\left(\frac{\omega_{20T_0}^2}{\omega_{10T_0}^2} - 1\right)\left(1 - \frac{\frac{\omega_{20T_0}^2}{\omega_{10T_0}^2}}{\left(\frac{\omega_{20T_0}^2}{\omega_{10T_0}^2} - 1\right)}(\alpha_2(T_2-T_0) - \alpha_1(T_1-T_0))\right)$$

A 'density optimized' flowtube will be designed to keep the ratio of frequencies constant with different density fluids and temperatures. Therefore when in thermal equilibrium at Temperature T $$T_1 = T_2 = T \quad (44)$$
$$\alpha_2 = \alpha_1 = \alpha$$

$$\left(\frac{\omega_{20T_2}^2}{\omega_{10T_1}^2} - 1\right) \approx \left(\frac{\omega_{20T_0}^2}{\omega_{10T_0}^2} - 1\right)\left(1 - \frac{\frac{\omega_{20T_0}^2}{\omega_{10T_0}^2}}{\left(\frac{\omega_{20T_0}^2}{\omega_{10T_0}^2} - 1\right)}\alpha(T_2 - T_1)\right) \quad (45)$$

Now it may not be possible to directly measure the appropriate temperatures corresponding to the mode significant temperatures $T_1, T_2$, but it is reasonable to assume that in steady-state both, and a flowtube measured temperature $T_m$ are linear combinations of the fluid temperature $T_f$ and the ambient temperature $T_a$, i.e.

$$T_1 = aT_f + (1-a)T_a$$

$$T_2 = bT_f + (1-b)T_a$$

$$T_m = cT_f + (1-c)T_a \tag{46}$$

Where a, b, c are in the range 0-1.

Rearranging to eliminate the ambient temperature we obtain $$T_2 - T_1 = bT_f + \frac{(1-b)}{(1-c)}(T_m - cT_f) - aT_f - \frac{(1-a)}{(1-c)}(T_m - cT_f)$$

$$= \frac{(b-a)}{(1-c)}(T_f - T_m) \tag{47}$$

Therefore an appropriate form of the massflow equation with temperature compensation is $$\dot{m}_{raw} = K_{\phi T_0}\left(\frac{r}{h^2 l}\right)_{T_0}\left(\frac{\omega_{20}^2}{\omega_{10}^2} - 1\right)\frac{1}{\omega_2}\tan\left(\frac{\varphi}{2}\right) \tag{48}$$

$$\dot{m}_{tcomp} = \dot{m}_{raw}(1 - \beta_1(T_1 - T_0))(1 - k_{td}(T_f - T_m))$$

Where $k_{td}$ is another flowtube specific constant $$k_{td} = \frac{\left(\frac{\omega_{20T_0}^2}{\omega_{10T_0}^2}\right)}{\left(\frac{\omega_{20T_0}^2}{\omega_{10T_0}^2} - 1\right)}\frac{(b-a)}{(1-c)}\alpha \tag{49}$$

An interesting prediction from equation (49) is that this temperature difference factor changes sign depending on whether the drive frequency is above or below the Coriolis frequency.

Note also that equation (48) includes the basic temperature compensation as a function of temperature $T_1$. It may be appropriate to approximate this by $T_f$ where, by inspection, the Coriolis mode will be more influenced by fluid temperature than flowtube body temperature $T_m$. In addition, equation (49) does not take into account the affect of mass flow on frequency. However, this may be taken into account using, for example, the second term in equation (20). For instance, $m_{raw}$ in equation (49) may be calculated based on equation (20), and then temperature compensated.

This analysis also may be used to compensate density calculations based on the temperature difference between the fluid temperature and the flowtube temperature. A basic equation for density derived from equation (25) is $$\rho = \frac{D_2}{\omega_2^2} + D_4 \tag{50}$$

The density calibrations constants $D_2$ and $D_4$ are functions of the flowtube stiffness, dimensions and enclosed volume and it is reasonable to assume that they may be characterized as having linear variation with temperature $$D_2 = D_{20}(1 + C(T_2 - T_0))$$

$$D_4 = D_{40}(1 + D(T_2 - T_0)) \tag{51}$$

Where C and D are flowtube type specific constants obtained by careful experiments with different density fluids with different stable 'equilibrium' temperatures, where $T_2 = T_1$ and $D_{20}$ and $D_{40}$ are base values at temperature $T_0$.

In the presence of a temperature differential across the flowtube, the ideal temperature to use is $T_2$, which is assumed to be approximated by $T_m$ but may not be able to be directly observed.

In that case, equation (47) can be rearranged to show that $$T_2 = T_m + \frac{(b-c)}{(1-c)}(T_f - T_m) \tag{52}$$

Therefore a correction for the temperature compensation of the density measurement in the presence of temperature difference may use an augmented temperature $T_m^*$ where $$T_m^* = T_m + k_{td2}(T_f - T_m) \tag{53}$$

Where $k_{td2}$ is an empirically determined constant for each flowtube type.

Therefore an algorithm for computing a density estimate in the presence of a temperature differential across the flowtube is a) Generate $T_m^*$ from equation (53)

b) Generate temperature compensated $D_2$ and $D_4$ from equation (51) using $T_m^*$ as an estimate of $T_2$ $$D_2 = D_{20}(1 + C(T_m^* - T_0))$$

$$D_4 = D_{40}(1 + D(T_m^* - T_0)) \tag{54}$$

c) Use equation (50) to obtain an estimate of fluid density from the drive frequency.

Note that an analogous procedure can be applied when using the Coriolis frequency to determine the fluid density (per, for example, the equation $$\rho_0 = \frac{E_2}{\omega_1^2} + E_4),$$

the equivalent equations to (52), (54), and (55) are $$T_1 = T_f - \frac{(1-a)}{(1-c)}(T_f - T_m) \tag{55}$$

$$T_f^* = T_f - k_{td1}(T_f - T_m) \tag{56}$$

$$E_2 = E_{20}(1 + E(T_f^* - T_0)) \tag{57}$$

$$E_4 = E_{40}(1 + F(T_f^* - T_0))$$

In addition, the temperature difference may be compensated in addition to the compensation for the affect of mass flow on frequency by using the temperature compensated coefficients $D_2$, $D_4$, $E_2$, $E_4$ (calculated, for example, from equations (55) and (58)) in equation (36).

Figure 10:
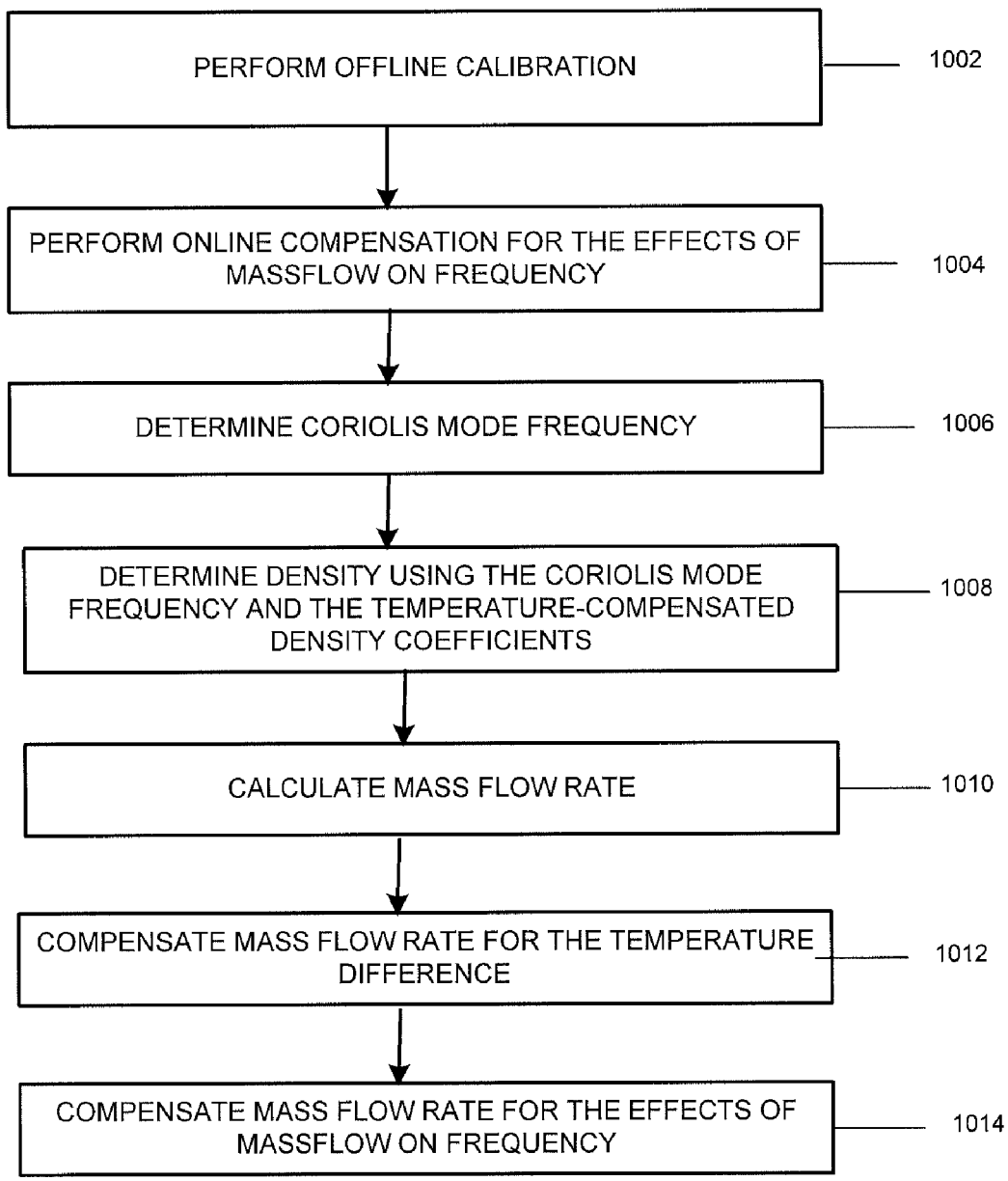
FIG. 10 is a flowchart illustrating a process for calibrating and configuring a flowmeter.

Meter Calibration and Configuration Process for Temperature and Mass Flow Rate Compensation Referring to FIG. 10, a process 1000 calibrates and configures a flowmeter transmitter to compensate for a temperature differential and the effect of mass flow rate on the frequency. The process 1000 includes performing an offline calibration using the following equation to determine the coefficient $K_d$ (1002). The coefficient $K_d$ describes the effect of massflow on frequency, for various massflow rates with phase angle $\phi$:

$$\rho_e - \rho_0 = -(\rho_0 - D_4)\left(\frac{\omega_{20}^2}{\omega_{10}^2} - 1\right)K_d \tan^2\left(\frac{\varphi}{2}\right). \tag{58}$$

The coefficient $K_d$ is computed using the known zero mass flow values of the frequencies $\omega_{20}$ and $\omega_{10}$. The ratio of the zero mass flow frequencies is a production controlled variable that is specific to each flowtube type. $D_4$ is the temperature compensated density calibration variable and may be determined from no-flow air/water tests. $\rho_e$ is the density that would be observed without massflow correction, $\rho_0$ is the true density at each point.

The process 1000 also includes performing an online compensation to account for the effects of massflow on frequency (1004). Using the following equation, discussed above as equation (37):

$$t_2 = \frac{K_\phi}{K_\theta}\frac{r^2}{h^2}\tan^2\left(\frac{\varphi}{2}\right)$$

with calibration constant $K_d$ from above to replace the combination of constants, $t_2$ may be determined as shown in the following equation.

$$t_2 = K_d \tan^2\left(\frac{\varphi}{2}\right) \tag{59}$$

Process 1000 continues by determining the Coriolis mode frequency $\omega_1$ (1006) from the following equation:

$$\omega_1^2 = \omega_2^2 \frac{(E_2 + (E_2 - D_2)t_2)^2}{(E_2 + (D_4 - E_e)t_2\omega_2^2)(D_2 + (D_4 - E_4)(1 + t_2)\omega_2^2)}.$$

The density is then determined using the Coriolis mode frequency and the temperature-compensated density coefficients (1008). For example, equation (36) is used with the temperature difference compensated density coefficients as per equations (53) and (55), (56) and (57) to calculate the density.

The process 1100 also includes calculating the mass flow rate (1010) using the following equation, which is a basic massflow equation:

$$\dot{m}_{raw} = K_{FC2} \cdot (1 + A(T_m - T_0)) \cdot \frac{1}{\omega_2}\tan\left(\frac{\varphi}{2}\right). \tag{60}$$

This is then compensated for temperature difference (1012) using the following equation, discussed above as equation (48)

$$\dot{m}_{tcomp} = \dot{m}_{raw} \cdot (1 - k_{td}(T_f - T_m)) \tag{61}$$

This quantity is then compensated for the effects of massflow on frequency (1014) which gives a massflow effect on massflow using equation (20)

$$\dot{m}_{output} = \dot{m}_{tcomp} \cdot \left(1 + k_m \tan^2\left(\frac{\varphi}{2}\right)\right) \tag{62}$$

Where the new coefficient $k_m$ is obtained from an offline massflow calibration procedure at the same time as the basic calibration factor $K_{FC2}$. A and $k_{td}$ are assumed to be flowtube type specific temperature coefficients which are determined by careful temperature controlled trials on an example flowtube characteristic of the size, wall thickness and construction material.

Additionally, linear compensation of the massflow and density readings as a function of an additional external pressure measurement may be performed. Pressure stiffens the flowtube but may also change the ratio of frequencies with corresponding effects on massflow and density readings as predicted by the equations in this document.

When using flowtubes in which the ratio of frequencies is not constant with different fluid densities (as discussed with respect to equation 32), the above form of the density equation may be used, but additional calibration steps may be needed to determine the calibration of the Coriolis mode frequency/density behavior for each individual tube. Equation (32) may be used with the various equations for compensating for the effect of mass flow on frequency to also take into account the variation of the ratio of frequencies with density. The same ratio of frequencies also appears in the temperature difference combinations but trials to determine all the effective constants for compensation may not be feasible. An alternative approach would be to use software to observe the effective Coriolis frequency online—this would be enhanced if the manufacturing of the flowtubes was optimized to produce a single 'clean' Coriolis frequency to track. This technique would also help to compensate for dynamic temperature change effects and the basic asymmetric effect of pressure of the vibrating frequencies as described further below.

Compensation with Coriolis Frequency

As indicated above, observation of the effective Coriolis frequency online may be used to compensate for dynamic temperature change effects and the basic asymmetric effect of pressure of the vibrating frequencies. Ignoring the effects of massflow on frequency (perfectly valid at low flow, and when comparing the same flowrates at different temperature conditions)

$$\dot{m} = K\left(\frac{\omega_2^2}{\omega_1^2} - 1\right)\frac{1}{\omega_2}\tan\left(\frac{\varphi}{2}\right)$$

where $\omega_2$ is the operating drive frequency and $\omega_1$ is the Coriolis mode frequency, $\phi$ the measured phase difference. K is a factor related to the stiffness of the flowtube and the linear dimensions that relate the observed deflection in the Coriolis mode to mass flow.

We expect to be able to characterize the changes in K with flowtube temperature, and we would expect that in thermal equilibrium the ratio of frequencies would remain constant—Both modes due to the change in Young's modulus and thermal expansion of similar material. But we now consider the case where the ratio of frequencies is not constant, but rather is a function of, for example, fluid density, temperature difference, or fluid pressure.

Assuming the basic temperature correction provided for the variation of K is correct, the above equation predicts that the true massflow will be related to the apparent massflow by $$\dot{m}_{true} = \frac{\left(\frac{\omega_2^2}{\omega_1^2} - 1\right)}{\left[\left(\frac{\omega_2^2}{\omega_1^2} - 1\right)\right]_0} \dot{m}_{apparent}$$

where the subscript 0 refers to the values at flowtube calibration conditions.

The change in frequency of oscillation with flowrate is described earlier; both the drive and the Coriolis mode frequencies change by the same factor in opposite directions (the higher goes up, the lower down).

This change in frequencies (with true massflow) affects the massflow calibration via the same mechanism as anything else which changes the frequencies, and results in a characteristic negative error at high flows. A simple correction algorithm has been demonstrated to correct for this effect, and it is important to understand the relationship between the known change in frequencies due to massflow and the unknown via temperature difference, fluid density pressure etc.

Theory suggests the true relationship between massflow and phase angle is given by the equation $$\dot{m} = K\left(\frac{\omega_2^2}{\omega_{10}^2} - 1\right)\frac{1}{\omega_2}\tan\left(\frac{\varphi}{2}\right)$$

where $\omega_2$ is the actual drive frequency and $\omega_{10}$ the Coriolis mode frequency at zero flow.

Applying the correction for the effect of massflow this equation becomes $$\dot{m} = K\left(\frac{\omega_{20}^2}{\omega_{10}^2} - 1\right)\frac{1}{\omega_2}\tan\left(\frac{\varphi}{2}\right)\cdot\left(1 + k_m\tan^2\left(\frac{\varphi}{2}\right)\right)$$

where $\omega_{20}$ is the equivalent zero flow drive frequency, $k_m$ a flowtube specific constant. This is a convenient form as without differential temperature or pressure effects this ratio of frequencies can often be assumed to remain constant.

Now the observed frequencies are related to these zero flow frequencies via the theoretical expression considering only the massflow effects $$\left(\frac{\omega_{20}^2}{\omega_{10}^2} - 1\right) = \left(\frac{\omega_2^2}{\omega_1^2}(1 - 2k\tan^2\left(\frac{\varphi}{2}\right)) - 1\right)$$

so a proposed algorithm for using the observed vibration frequencies to automatically account for temperature difference (or fluid density or pressure) is to use the form $$Mfact = \frac{\left(\frac{\omega_2^2}{\omega_1^2}(1 - 2k\tan^2\left(\frac{\varphi}{2}\right)) - 1\right)}{\left(\frac{\omega_{20}^2}{\omega_{10}^2} - 1\right)_{nom}}$$

$$\dot{m}_{corrected} = Mfact\cdot K\left(\frac{\omega_{20}^2}{\omega_{10}^2} - 1\right)_{nom}\cdot\frac{1}{\omega_2}\tan\left(\frac{\varphi}{2}\right)\cdot\left(1 + k_m\tan^2\left(\frac{\varphi}{2}\right)\right)$$

Theoretically, $$k = \left(\frac{\omega_{20}^2}{\omega_{10}^2} - 1\right)k_d, k_m = \left(\frac{\omega_{20}^2}{\omega_{10}^2}\right)k_d,$$

where $k_d$ is the coefficient used in the massflow independent density equation. The relationship between $k_d$ and $k_m$ can be experimentally verified to within 10%, the difference explainable in terms of temperature and pressure variation during trials, which means that this equation could be simplified. However it is preferably to leave it in this form as the Mfact term can be heavily filtered to track relatively slow changes in pressure/temperature only. Keeping $k_m$ separate also allows a degree of tuning to help match theory/experiment.

Code Example

The following is an example of code for implementing some of the foregoing techniques in a Coriolis flowmeter transmitter.

```
/*
double tmp;
double my_square( double x )
{
    return (x*x);
}
/* Estimate the Coriolis mode frequency */
 double omegals( double c2, double D2, double D4, double E2,
double E4)
{
    double pd, t2;
    pd = phase_stats->getMean( ); //use a filtered version of
phase difference
    t2 = flowtube_defaults.dens_McorK_fact * my_square( tan(
my_pi * pd / 360.0 ) );
    tmp = my_square(E2+(E2-D2)*t2)/(E2+(D4-E4)*t2*c2)/(D2+(D4-
E4)*(1.0+t2)*c2);
    return ( c2 * tmp ) ;
}
/*
Protected form of sqrt for use in corrected density calculation
Halts transmitter if attempts to do square root of negative
number
Replace before production use
*/
double my_squareroot( double x )
{
    if ( x<0 )
    {
        send_message("Fatal error in density correction
coefficients or equation",1,1);
        exit(1);
    }
    return ( sqrt(x) );
}
void calculate_density_basic (meas_data_type * p, meas_data_type
* op, int validating)
{
    /* foxboro variables */
    double c2, Tz, z1, z2, z3, z4, z5, z6;
```

```
/*correction variables*/
    double c1, D2, D4, E2, E4;
        Tz = p->temperature_value – 20.0;
        c2 = p->n_freq;
        c2 = (c2 * c2) / 256.0;
        p->raw_dens = (DK1 * Tz + DK2) / c2 + DK3 * Tz + DK4;
/* Use density correction for flow method if enabled */
        if ( do_dens_corr_flow == 1 )
        {
            /* temperature correct density constants, including correct
for Tdiff */
            if ( do_dens_corr_Tdiff == 1 )
                Tz += flowtube_defaults.dens_Tdiff_fact *
                    ( p->temperature_value – p->fluid_temperature
);
            D2 = DK2 + DK1*Tz;
            D4 = DK4 + DK3*Tz;
            E2 = EK2 + EK1*Tz;
            E4 = EK4 + EK3*Tz;
            c1 = omegals( c2, D2, D4, E2, E4);
            /* Calculate density with optional offset applied
by bias term*/
            p->density_value = dens_flow_bias + 0.5 *
            (
                (D4 + E4) + my_squareroot( 4.0 * D2 * E2 /
(c2*c1) + my_square(D4–E4) )
            );
        }
        else
        {
            p->density_value = p->raw_dens;
            if (do_dens_corr_pres == 1)
            {
                p->density_value = p->density_value * ( 1.0 +
                flowtube_defaults.dens_pressure_fact * ( p-
>pressure – calibration_pressure ) );
            }
        }
void calculate_massflow_basic (meas_data_type * p,
            meas_data_type * op, int validating)
{
#define sqr(x) ((x)*(x))
    double Tz;
    double noneu_mass_flow;
    double pd;
    /* Flow correction variables */
    double km,kmd,m,d;
    /* check for non-standard conditions */
    if (measurement_task != NORMAL_MEASUREMENT)
    {
        abnormal_massflow (p, op, validating);
        return;
    }
// Compute massflow
// ----------------
    pd = p->phase_diff;
...
    /* calculate non-engineering units mass flow */
        if (amp_sv1 < 1e-6)
            noneu_mass_flow = 0.0;
        else
            noneu_mass_flow = 2.0 * tan ( my_pi * pd / 360.0
); // latest 2*tan (phase/2) option
        // convert to engineering units
        Tz = p->temperature_value – 20.0;
        p->raw_mass = 200.0 * flow_factor * 16.0 * (FC1 * Tz +
FC3 * Tz * Tz + FC2)
            * noneu_mass_flow / p->v_freq;
        if (do_flow_corr_flow == 1)
        {
            /* Flowtube constants */
            km = flowtube_defaults.flow_McorK_fact;
            m = tan ( my_pi * phase_stats->getMean( ) / 360.0
);
            p->massflow_value = p->raw_mass * (1.0 + km * m *
m );
        }
        else
        {
            p->massflow_value = p->raw_mass;
        }
        if (do_flow_corr_pres == 1)
        {
            p->massflow_value = p->massflow_value *
                ( 1.0 + flowtube_defaults.flow_pressure_fact
*
                ( p->pressure – calibration_pressure ) );
        }
/* mass flow compensation for temperature difference */
        if (do_flow_corr_Tdiff == 1)
        {
            p->massflow_value = p->massflow_value *
                ( 1.0 + flowtube_defaults.flow_Tdiff_fact *
                ( p->temperature_value – p->fluid_temperature
) );
        }
```

A number of implementations have been described. Nevertheless, it will be understood that various modifications may be made. Accordingly, other implementations are within the scope of the following claims.

What is claimed is:

1. A flowmeter transmitter comprising:
    at least one processing device; and
    a storage device, the storage device storing instructions for causing the at least one processing device to:
        induce motion in a conduit including a fluid such that the conduit vibrates in a first mode of vibration having an associated first frequency of vibration and a second mode of vibration having an associated second frequency of vibration, wherein a ratio between the first frequency and the second frequency during a zero-flow condition varies over time;
        determine a value representing one or more observable conditions of the conduit;
        determine a quantity based on the value representing one or more observable conditions of the conduit, the quantity including a ratio between the first frequency during a zero-flow condition and the second frequency during a zero-flow condition; and
        determine a property of the fluid based on the quantity.

2. The transmitter of claim 1, wherein the one or more observable conditions includes a phase difference between the motion of the conduit at a first point of the conduit and the motion of the conduit at a second point of the conduit.

3. The transmitter of claim 1, wherein the one or more observable conditions includes at least one of the first frequency of vibration and the second frequency of vibration.

4. The transmitter of claim 1, wherein the value representing one or more observable conditions of the conduit includes a value of a phase difference between the motion of the conduit at a first point of the conduit and the motion of the conduit at a second point of the conduit and at least one of the first frequency of vibration and the second frequency of vibration.

5. The transmitter of claim 4, wherein the value representing one or more observable conditions of the conduit includes a value of a phase difference between the motion of the conduit at a first point of the conduit and the motion of the conduit at a second point of the conduit and the second frequency of vibration, and the second mode of vibration is a driven mode.

6. The transmitter of claim 1, wherein the storage device further comprises instructions for causing the at least one processing device to:
    determine, at a first time, the first frequency of vibration and the second frequency of vibration;

determine, at a second time, the first frequency of vibration and the second frequency of vibration,
wherein at least one of the first frequency of vibration and the second frequency of vibration are different at the first time and the second time.

7. A flowmeter transmitter comprising:
at least one processing device; and
a storage device, the storage device storing instructions for causing the at least one processing device to:
induce motion in a conduit including a fluid such that the conduit vibrates in a Coriolis mode of vibration having an associated first frequency of vibration and a driven mode of vibration having an associated second frequency of vibration, wherein a ratio between the first frequency and the second frequency during a zero-flow condition varies over time;
determine a phase difference between the motion of the conduit at a first point of the conduit and the motion of the conduit at a second point of the conduit;
determine the second frequency of vibration; and
determine a quantity based on the phase difference and the second frequency of vibration, the quantity including a ratio between the first frequency during a zero-flow condition and the second frequency during a zero-flow condition; and
determine a density of the fluid based on the quantity.

8. The transmitter of claim 7, wherein the storage device further stores instructions for causing the at least one processor to access a calibration constant, and wherein the quantity is further based on the calibration constant.

9. The transmitter of claim 8, wherein the calibration constant comprises a calibration constant related to a physical property of the conduit.

10. The transmitter of claim 9, wherein the storage device further stores instructions for causing the at least one processor to:
determine a reference temperature;
determine a first temperature that influences the Coriolis mode of vibration; and
determine a second temperature that influences the driven mode of vibration.

11. The transmitter of claim 10, wherein the instructions further comprise instructions to compensate the calibration constants based on the first temperature, the second temperature, and the reference temperature.

12. The transmitter of claim 11, wherein the instructions to determine the density of the fluid based on the quantity comprise instructions to determine the density of the fluid based on the quantity and the compensated calibration constants.

13. A method comprising:
inducing motion in a conduit including a fluid such that the conduit vibrates in a first mode of vibration having an associated first frequency of vibration and a second mode of vibration having an associated second frequency of vibration, wherein a ratio between the first frequency and the second frequency during a zero-flow condition varies over time;
determining a value representing one or more observable conditions of the conduit;
determining a quantity based on the value representing one or more observable conditions of the conduit, the quantity including a ratio between the first frequency during a zero-flow condition and the second frequency during a zero-flow condition; and
determining a property of the fluid based on the quantity.

14. The method of claim 13, wherein the one or more observable conditions includes a phase difference between the motion of the conduit at a first point of the conduit and the motion of the conduit at a second point of the conduit.

15. The method of claim 13, wherein the one or more observable conditions includes at least one of the first frequency of vibration and the second frequency of vibration.

16. The method of claim 13, wherein the value representing one or more observable conditions of the conduit includes a value of a phase difference between the motion of the conduit at a first point of the conduit and the motion of the conduit at a second point of the conduit and at least one of the first frequency of vibration and the second frequency of vibration.

17. The method of claim 16, wherein the value representing one or more observable conditions of the conduit includes a value of a phase difference between the motion of the conduit at a first point of the conduit and the motion of the conduit at a second point of the conduit and the second frequency of vibration, and the second mode of vibration is a driven mode.

18. The method of claim 13, further comprising:
determining, at a first time, the first frequency of vibration and the second frequency of vibration; and
determining, at a second time, the first frequency of vibration and the second frequency of vibration,
wherein at least one of the first frequency of vibration and the second frequency of vibration are different at the first time and the second time.

19. A flowmeter comprising:
a vibratable flowtube;
a driver connected to the flowtube and configured to impart motion to the flowtube;
a sensor connected to the flowtube and configured to sense the motion of the flowtube and generate a sensor signal; and
a controller to receive the sensor signal and configured to:
apply a drive signal to the driver to induce motion in a conduit including a fluid such that the conduit vibrates in a first mode of vibration having an associated first frequency of vibration and a second mode of vibration having an associated second frequency of vibration, wherein a ratio between the first frequency and the second frequency during a zero-flow condition varies over time;
determine a value representing one or more observable conditions of the conduit;
determine a quantity based on the value representing one or more observable conditions of the conduit, the quantity including a ratio between the first frequency during a zero-flow condition and the second frequency during a zero-flow condition; and
determine a property of the fluid based on the quantity.

20. The flowmeter of claim 19, wherein the one or more observable conditions includes a phase difference between the motion of the conduit at a first point of the conduit and the motion of the conduit at a second point of the conduit.

* * * * *